US008700079B2

(12) United States Patent
Jovicic et al.

(10) Patent No.: US 8,700,079 B2
(45) Date of Patent: Apr. 15, 2014

(54) METHOD AND APPARATUS FOR INCREASING THE RATE OF PEER DISCOVERY IN A SYNCHRONIZED PEER TO PEER WIRELESS NETWORK

(75) Inventors: Aleksandar Jovicic, Jersey City, NJ (US); Xinzhou Wu, Monmouth Junction, NJ (US)

(73) Assignee: QUALCOMM Incorporated, San Deigo, CA (US)

( * ) Notice: Subject to any disclaimer, the term of this patent is extended or adjusted under 35 U.S.C. 154(b) by 313 days.

(21) Appl. No.: 13/231,654

(22) Filed: Sep. 13, 2011

(65) Prior Publication Data

US 2013/0065620 A1 Mar. 14, 2013

(51) Int. Cl.
 *H04W 48/16* (2009.01)
 *H04W 24/00* (2009.01)

(52) U.S. Cl.
 USPC .......... 455/517; 455/41.2; 455/3.01; 455/458

(58) Field of Classification Search
 USPC ........... 455/3.01, 3.05, 454, 452.1, 509, 41.2, 455/517, 500, 67.11, 458, 515, 434; 370/235, 254, 329
 See application file for complete search history.

(56) References Cited

U.S. PATENT DOCUMENTS

| 7,117,264 | B2 | 10/2006 | Becker et al. | |
|---|---|---|---|---|
| 2003/0095504 | A1* | 5/2003 | Ogier | 370/235 |
| 2006/0171332 | A1* | 8/2006 | Barnum | 370/254 |
| 2009/0287827 | A1 | 11/2009 | Horn et al. | |
| 2009/0318138 | A1* | 12/2009 | Zeng et al. | 455/431 |
| 2009/0325601 | A1 | 12/2009 | Park et al. | |
| 2009/0327395 | A1 | 12/2009 | Park et al. | |
| 2010/0254308 | A1 | 10/2010 | Laroia et al. | |

OTHER PUBLICATIONS

Ho, Tracey et al., "A Random Linear Network Coding Approach to Multicast", IEEE Transactions on Information Theory, vol. 52, No. 10, Oct. 2006.
Bhatnagar A., et al., "Layer net: a new self-organizing network protocol", 19900930; 19900930-19901003, Sep. 30, 1990, pp. 845-849, XP010002890.
International Search Report and Written Opinion—PCT/US2012/055182—ISA/EPO—Nov. 30, 2012.

* cited by examiner

*Primary Examiner* — John J Lee
(74) *Attorney, Agent, or Firm* — James K. O'Hare

(57) ABSTRACT

Various methods and apparatus are directed to communicating peer discovery information in an efficient manner. A wireless device which has received peer discovery information from multiple peer devices in its vicinity combines received peer discovery information and transmits a signal communicating the combined information. In some embodiments, the combining includes performing a linear combination. The transmitted signal including the combined peer discovery information corresponding to multiple devices facilitates the recovery of peer discovery information by peer devices which may be out of direct peer to peer communications range to one of the devices whose information was used to produce the combined signal. Different peer devices may be able to recover different peer discovery information from the same combined signal. Thus the wireless device may effectively relay a first peer discovery message to one peer device and a second peer discovery message to another peer device via the same combined signal.

16 Claims, 27 Drawing Sheets

METHOD AND APPARATUS FOR INCREASING THE RATE OF PEER DISCOVERY IN A SYNCHRONIZED PEER TO PEER WIRELESS NETWORK

FIELD

Various embodiments are directed to peer discovery signaling, and more particularly to efficiently relaying peer discovery information.

BACKGROUND

In a peer to peer wireless network, devices may broadcast information for the purposes of discovery. It is advantageous to enable the devices to discover as many peers as possible in a given amount of time. The number of discovered peers is typically limited by the range of the broadcast signals which is imposed by the transmission power constraints of the mobile devices. One approach for extending the range of peer discovery signals is for mobile devices to simply re-transmit a signal that they have previously received in order to enable other devices to decode the broadcast messages of peers that they cannot directly receive. While straightforward to implement, this method is not the most efficient in terms of maximizing the rate of peer discovery, e.g., maximizing the total number of discovered messages in the network.

In view of the above, there is a need for new methods and apparatus for relaying discovery information in a more efficient manner.

SUMMARY

Various methods and apparatus are directed to communicating peer discovery information in an efficient manner. A wireless device which has received peer discovery information from multiple peer devices in its vicinity combines received peer discovery information and transmits a signal communicating the combined information. In some embodiments, the combining includes performing a linear combination. The transmitted signal including the combined peer discovery information corresponding to multiple devices facilitates the recovery of peer discovery information by peer devices which may be out of direct peer to peer communications range to one of the devices whose information was used to produce the combined signal. Different peer devices may be able to recover different peer discovery information from the same combined signal. Thus the wireless device may effectively relay a first peer discovery message to one peer device and a second peer discovery message to another peer device via the same combined signal.

An exemplary method of operating a wireless device, in accordance with some embodiments, comprises: receiving peer discovery signals from other peer devices and transmitting a generated peer discovery signal which is a combination of peer discovery information received from other peer devices. An exemplary wireless device, in accordance with some embodiments, comprises at least one processor configured to: receive peer discovery signals from other peer devices and transmit a generated peer discovery signal which is a combination of peer discovery information received from other peer devices. The exemplary wireless communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
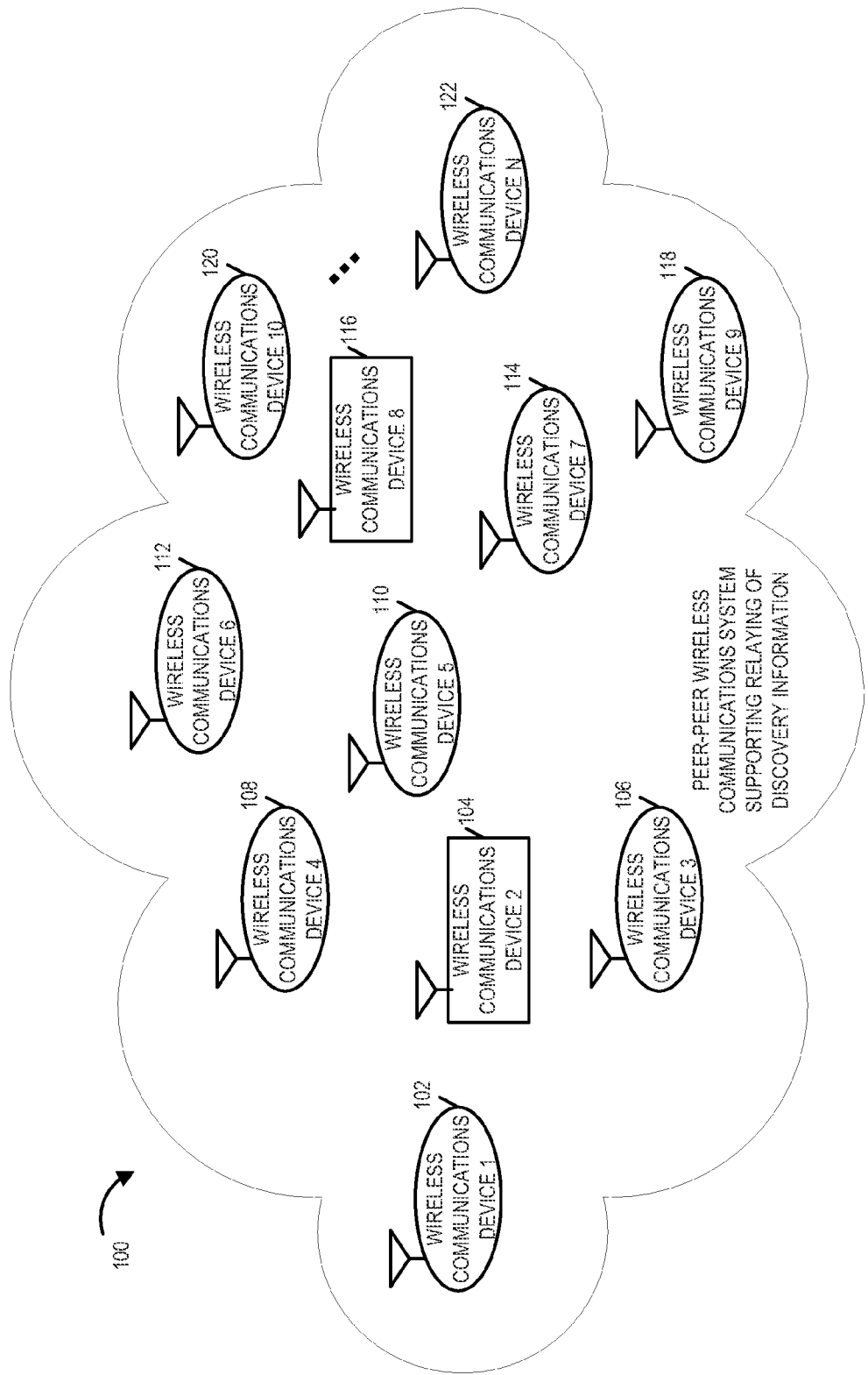
FIG. 1 is a drawing of an exemplary peer to peer wireless communications system supporting the relaying of peer discovery information in accordance with various exemplary embodiments.

FIG. 1 is a drawing of an exemplary peer to peer wireless communications system 100 supporting the relaying of peer discovery information in accordance with various exemplary embodiments. Exemplary peer to peer wireless communications system 100 includes a plurality of wireless communications devices (wireless communications device 1 102, wireless communications device 2 104, wireless communications device 3 106, wireless communications device 4 108, wireless communications device 5 110, wireless communications device 6 112, wireless communications device 7 114, wireless communications device 8 116, wireless communications device 9 118, wireless communications device 10 120, . . . , wireless communications device N 122) which support a peer to peer signaling protocol which includes relaying combined peer discovery information. Exemplary wireless communications devices (102, 106, 108, 110, 112, 114, 118, 120, 122) are mobile devices while wireless communications devices (104, 116) are stationary devices.

Wireless communications devices within system 100 may establish peer to peer networks, e.g., localized peer to peer networks. Some such peer to peer networks use a decentralized control approach. Wireless communications devices within an established peer to peer network maintain a common sense of synchronization, e.g., based on a common timing source. In some embodiments, devices within a peer to peer network acquire a peer discovery identifier, e.g., a locally unique peer discovery identifier. In some such embodiments, wireless devices within the peer to peer network follow a predetermined recurring timing and frequency structure. In some such embodiments, predetermined peer discovery air link resources correspond to each of the peer discovery identifiers. In various embodiments, at least some of the wireless devices can, and sometimes do, combine peer discovery information received from other devices and transmit the combined peer discovery information.

Figure 2:
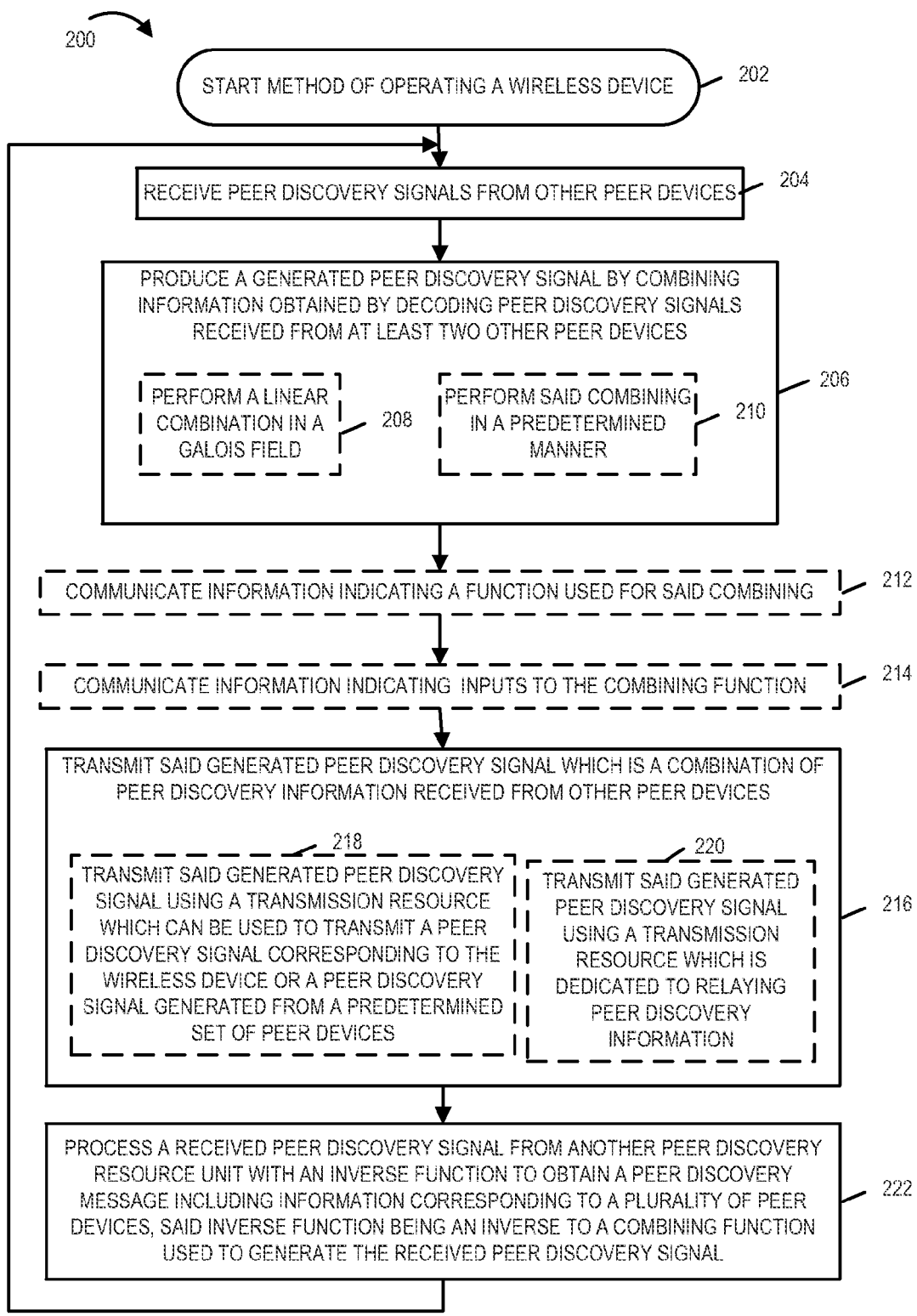
FIG. 2 is a flowchart of an exemplary method of operating a wireless device in accordance with various exemplary embodiments.

FIG. 2 is a flowchart 200 of an exemplary method of operating a wireless device in accordance with various exemplary embodiments. Operation starts in step 202, where the wireless device is powered on and initialized. Operation proceeds from start step 202 to step 204. In step 204 the wireless device receives peer discovery signals from other peer devices. In some embodiments, the received peer discovery signals are received on peer discovery resources units, said peer discovery resource units being OFDMA time-frequency resource units. In some such embodiments, the peer discovery resource units are OFDM tone-symbols in a peer discovery interval in a recurring peer to peer timing structure. For example, each peer discovery resource unit may correspond to set of OFDM tone-symbols of a predetermined size.

Operation proceeds from step 204 to step 206. In step 206 the wireless device produces a generated peer discovery signal by combining information obtained from decoding peer discovery signals received from at least two other peer devices. In some embodiments, step 206 includes one or both of steps 208 and 210. In step 208 the wireless device performs a linear combination in a Galois field as part of said combining. In step 210 the wireless device performs said combining in a predetermined manner, e.g., in accordance with a predetermined combining function. Operation proceeds from step 206 to step 212.

In step 212 the wireless device communicates information indicating a function used for the combining of step 206. Operation proceeds from step 212 to step 214. In step 214 the wireless device communicates information indicating inputs to the combining function of step 212. In some embodiments, the inputs identify peer discovery identifiers and/or peer discovery resource units. Operation proceeds from step 214 to step 216.

In step 216 the wireless device transmits said generated peer discovery signals which is a combination of peer discovery information received from other peer devices. Step 216 may, and in some embodiments, does include one of steps 218 and 220. In some embodiments, the same one or step 218 and 220 is included in step 216 for each iteration of the loop of flowchart 200. In some other embodiments, during one iteration of the loop of flowchart 200 step 216 includes step 218 and during another iteration of the flowchart 200 step 216 includes step 220.

In step 218 the wireless device transmits said generated peer discovery signal using a transmission resource which can be used to transmit a peer discovery signal corresponding to the wireless device or a peer discovery signal generated from a predetermined set of peer devices. In step 220 the wireless device transmits said generated peer discovery signal using a transmission resource which is dedicated to relaying peer discovery information. In some embodiments, the information which is combined in step 206 is a function of the communications resource unit used to transmit the combined information, e.g., the tone-symbol or symbols and/or transmission time slot used to transmit the combined information. In some embodiments, the transmitted generated peer discovery signal includes information indicating that the transmitted generated peer discovery signal is a peer discovery signal which includes a combination of peer discovery information received from other devices.

Operation proceeds from step 216 to step 222. In step 222 the wireless device processes a received peer discovery resource unit with an inverse function to obtain a peer discovery message including information corresponding to a plurality of peer devices, said inverse function being an inverse to a combining function used to generate the received peer discovery signal. Operation proceeds from step 222 to step 204.

Steps 212 and 214 are optional steps which are included in some embodiments and not included in other embodiments. In an embodiment where step 212 and/or step 214 are not included, operation bypasses the omitted step or steps in the flow. In some embodiments, one or more of steps 212 and 214 are included as part of step 216. In some embodiments in which one predetermined combining function is used and the predetermined combining function is known to the wireless devices in the system, there is not a need communicate how the information is being combined. In some embodiments in which a particular predetermined combining function is used corresponding to a particular transmission resource unit which is dedicated to relaying peer discovery information and the particular predetermined combining function is known to the wireless devices in the system, there is not a need communicate how the information is being combined. In some embodiments, corresponding to a particular transmission resource unit which is dedicated to relaying peer discovery information there is a predetermined known mapping to other peer discovery resource units and the mapping is known to the wireless devices in the system and there is not a need to communicate information identifying the resource units corresponding to the inputs of the combining.

Figure 3:
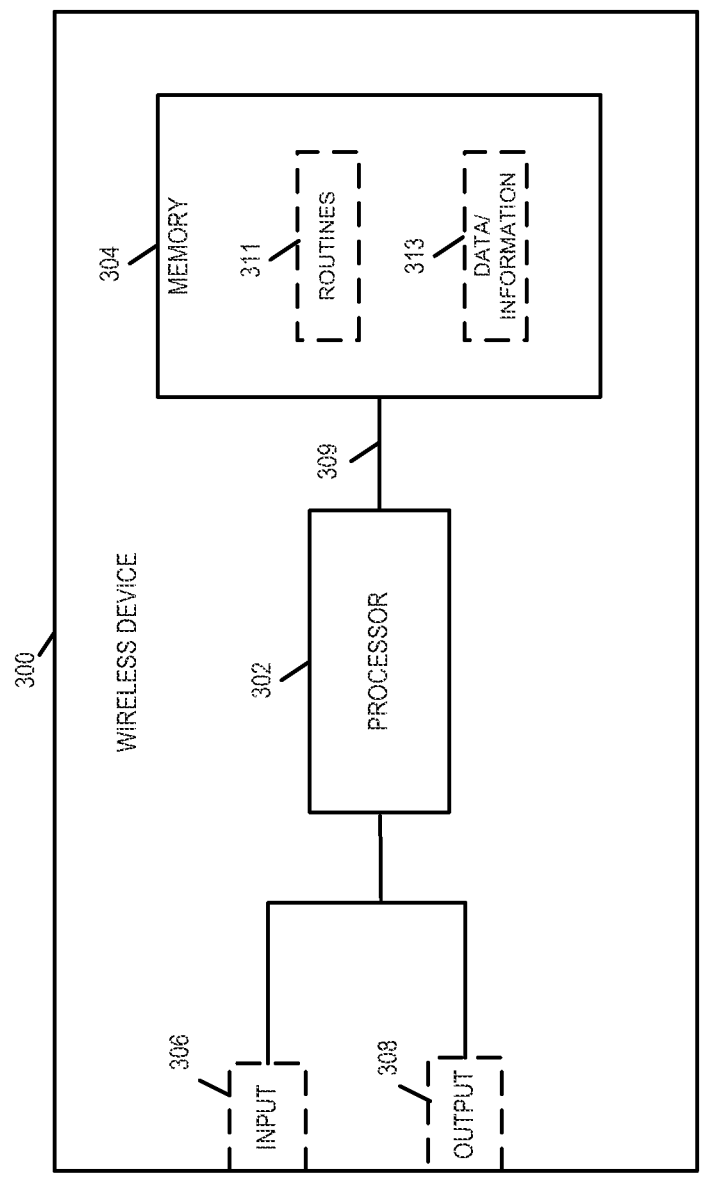
FIG. 3 is a drawing of an exemplary wireless device in accordance with an exemplary embodiment.

FIG. 3 is a drawing of an exemplary wireless device 300 in accordance with an exemplary embodiment. Exemplary wireless device 300 is, e.g., one of the wireless communications devices of system 100 of FIG. 1. Wireless device 300 is, e.g., a wireless communications device which supports a peer to peer signaling protocol including combining peer discovery information received from multiple peer devices and relaying combined peer discovery information. Exemplary wireless device 300 may, and sometimes does, implement a method in accordance with flowchart 200 of FIG. 2.

Wireless device 300 includes a processor 302 and memory 304 coupled together via a bus 309 over which the various elements (302, 304) may interchange data and information. Wireless device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In various embodiments, processor 302 is configured to: receive peer discovery signals from other peer devices and transmit a generated peer discovery signal which is a combination of peer discovery information received from other peer devices. In some embodiments, received peer discovery signals are received on peer discovery resource units, said peer discovery resource units being OFDMA time-frequency resource units.

In some such embodiments, processor 302 is further configured to produce said generated peer discovery signal by combining information obtained by decoding peer discovery signals received from at least two other peer devices, prior to transmitting the generated peer discovery signal. In various embodiments, processor 302 is configured to perform a linear combination in a Galois field, as part of said combining. In some embodiments, the information which is combined is a function of the communications resource unit, e.g., tone-symbol and/or transmission time slot, used to transmit the combined information.

In some embodiments, processor 302 is configured to perform said combining in a predetermined manner. In some embodiments, the wireless communications device including processor 302 does not communicate how the information was combined.

In some other embodiments, processor 302 is further configured to communicate information indicating a function used for said combining. In some embodiments, processor 302 is further configured to: communicate information indicating inputs to the combining function.

In various embodiments, processor 302 is configured to transmit said generated peer discovery signal using a transmission resource which can be used to transmit a peer discovery signal corresponding to said wireless device or a peer discovery signal generated from signals received from a predetermined set of peer devices, as part of being configured to said transmitting a generated peer discovery signal. In some embodiments, the transmitted generated peer discovery signal includes information indicating that the transmitted generated peer discovery signal is a peer discovery signal which is a combination of peer discovery information received from other peer devices. In some such embodiments, processor 302 is configured to include information indicating that the transmitted generated peer discovery signal is a peer discovery signal which is a combination of peer discovery information received from other peer devices, as part of producing a generated peer discovery signal. In some such embodiments, there is a bit in a peer discovery signal used for indicating whether the peer discovery signal is conveying a peer discovery signal corresponding to said wireless device or a peer discovery signal generated from signals received from a predetermined set of peer devices. In some embodiments, processor 302 is configured transmit said generated peer discovery signal using a transmission resource which is dedicated to relaying peer discovery information, as part of being configured to transmit said generated peer discovery signal.

In various embodiments, processor 302 is further configured to: process a received peer discovery signal from another peer discovery resource unit with an inverse function to obtain a peer discovery message including information corresponding to a plurality of peer devices, said inverse function being an inverse to a combining function used to generate the received peer discovery signal.

Figure 4:
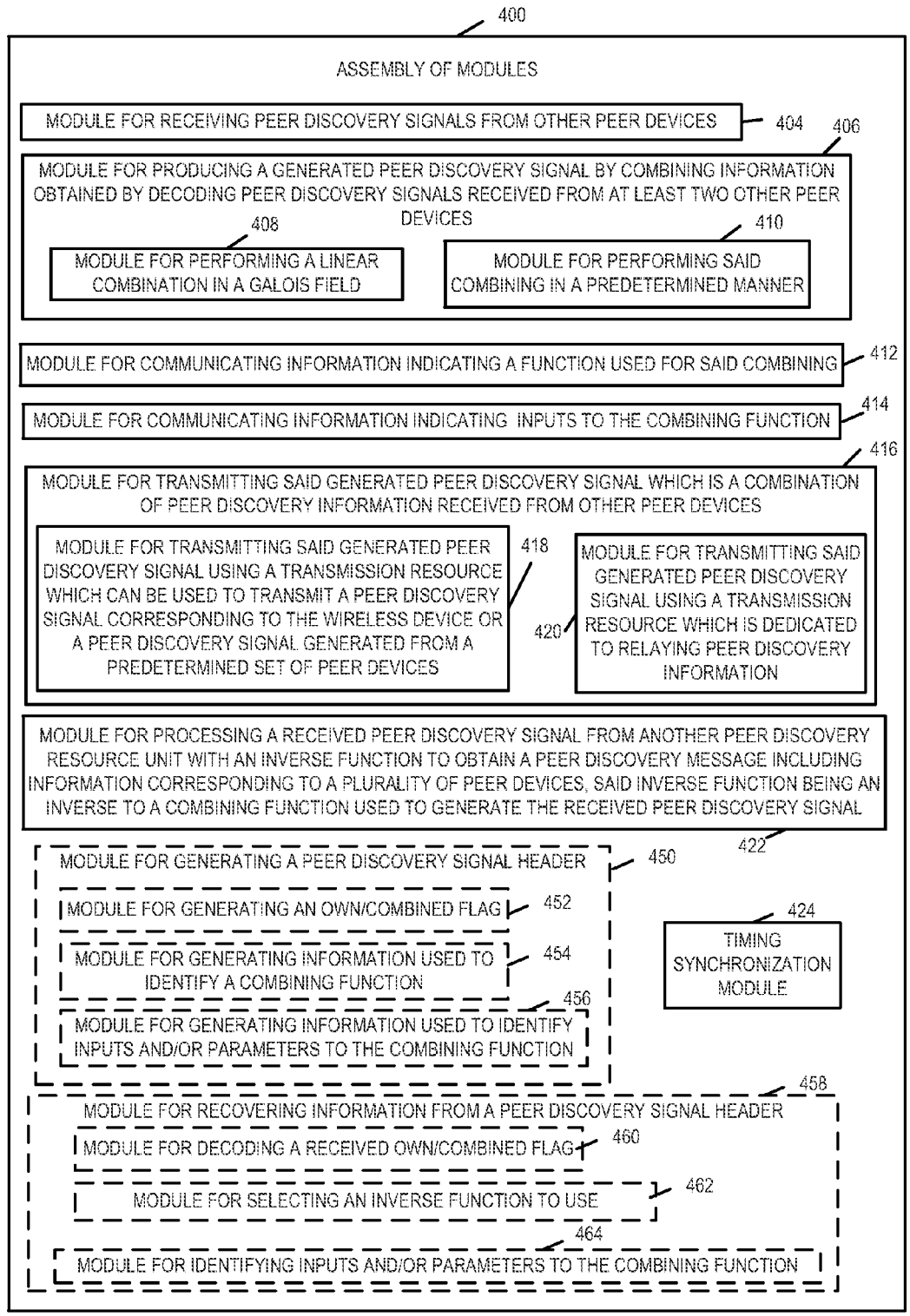
FIG. 4 is an assembly of modules which can, and in some embodiments is, used in the exemplary wireless device illustrated in FIG. 3.

FIG. 4 is an assembly of modules 400 which can, and in some embodiments is, used in the exemplary wireless device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless device 300 or elements therein such as the processor 302, to perform the functions of the corresponding steps illustrated and/or described in the method of flowchart 200 of FIG. 2.

Assembly of modules 400 includes a module 404 for receiving peer discovery signals from other peer devices 404, a module for producing a generated peer discovery signals by combining information obtained by decoding peer discovery signals received from at least two other peer devices 406, a module for communicating information indicating a function used for said combining 412, a module for communicating information indicating inputs to the combining function 414, and a module for transmitting said generated peer discovery signal which is a combination of peer discovery information received from other peer devices 416. Module 406 includes a module for performing a linear combination in a Galois field 408 and a module for performing said combining in a predetermined manner 410. Module 416 includes a module for transmitting said generated peer discovery signal using a transmission resource which can be used to transmit a peer discovery signal corresponding to the wireless device or a peer discovery signal generated from a predetermined set of peer devices 418 and a module for transmitting said generated peer discovery signal using a transmission resource which is dedicated to relaying peer discovery information 420.

Assembly of modules 400 further includes a module for processing a received peer discovery signal from another peer discovery resource unit with an inverse function to obtain a peer discovery message including information corresponding to a plurality of peer devices, said inverse function being an inverse to a combining function used to generate the received peer discovery signal 422. Assembly of modules 400 further includes a timing synchronization module 424 for synchronizing the wireless device with other peer devices in accordance with a recurring peer to peer timing structure being used in the peer to peer network.

In some embodiments, assembly of modules 400 further includes a module for generating a peer discovery signal header 450 and a module for recovering information from a peer discovery signal header 458. Module 450 includes a module for generating an own/combined flag 452, a module for generating information used to identify a combining function 454 and a module for generating information used to identify inputs and/or parameters to the combining function 456. Module 458 includes a module for decoding a received own/combined flag 460, a module for selecting an inverse function to use to recover peer discovery information being communicated 462, and a module for identifying inputs and/or parameters to the combining function 464. In some embodiments, the same peer discovery resource unit in the frequency timing structure may be used for communicating a transmitting device's own peer discovery message or combined information corresponding to multiple other peer discovery devices, e.g., with the transmitting device serving as a processing/relay device. In some such embodiments, the O/C flag in the header is used to distinguish what type of message is in the payload of the transmitted peer discovery signal. In some embodiments, different combining functions may be used and/or selected, e.g., a combining function which combines peer discovery information from two devices or a combining function which combines peer discovery information from three devices, and a field in the peer discovery header is used to identify the combining function which is being used. In some embodiments, different inputs may be selected to be combined, e.g., information from different peer discovery resource units corresponding to different devices may be combined, and a field in the peer discovery header is used to identify what is being combined.

In some embodiments, which peer discovery resource units are to be used for transmitting a device's own peer discovery information and which peer discovery resources are to be used for communicating combined information is predetermined and an O/C field is not included in the peer discovery message header. In some embodiments, there is only one combining function used and a field to identify the combining function is not used. In some embodiments, the inputs to the combining function are predetermined corresponding to a particular peer discovery resource unit and a field to identify inputs to the combining function is not used.

Figure 5:
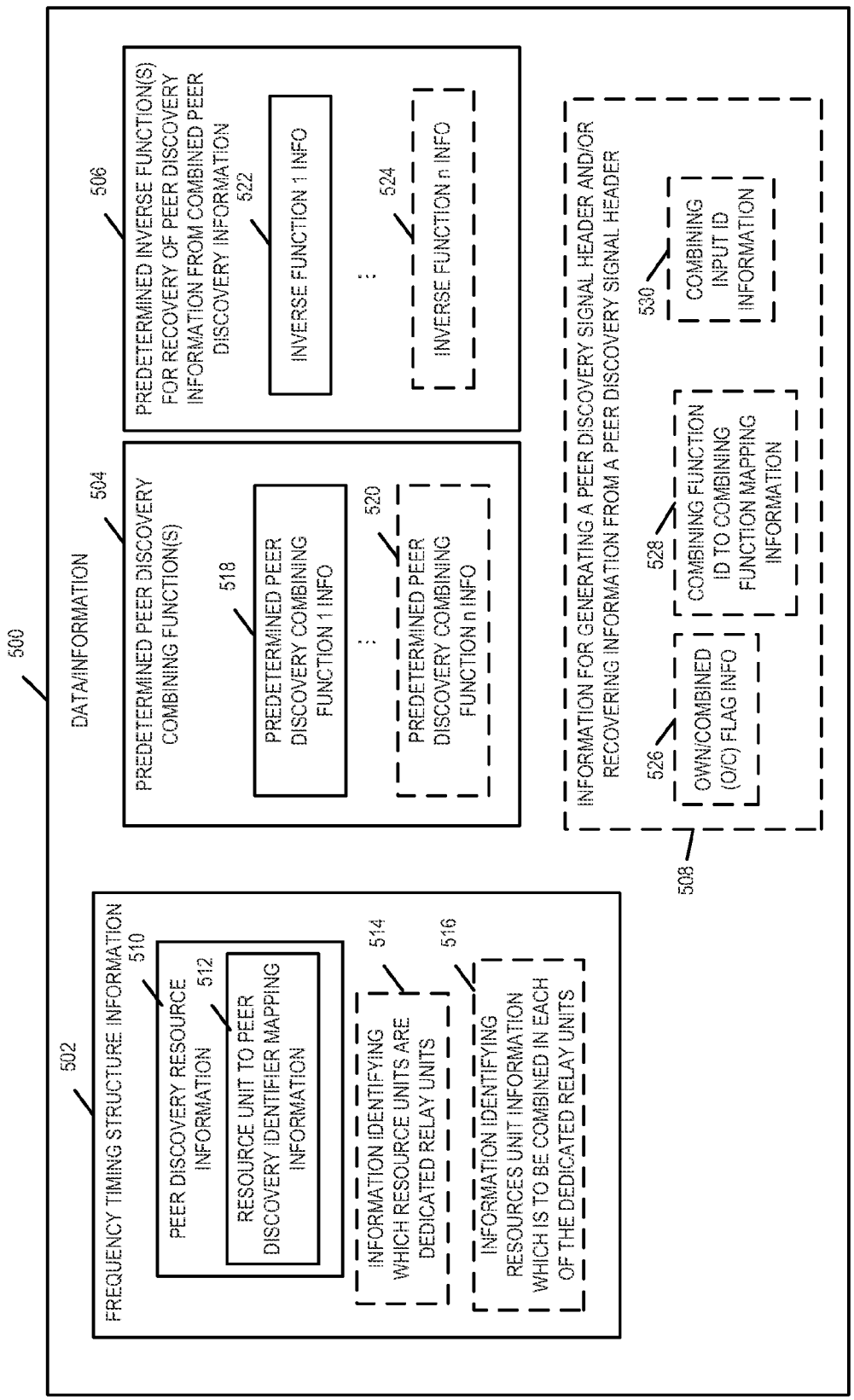
FIG. 5 is a drawing of exemplary data/information which can, and in some embodiments is, used in the exemplary wireless device illustrated in FIG. 3.

FIG. 5 is a drawing of exemplary data/information 500 in accordance with various embodiments. Data/information 500 is, e.g., included in data/information 313 of wireless communications device 300 of FIG. 3. Data/information 500 includes frequency/timing structure information 502, predetermined peer discovery combining function(s) 504, and predetermined inverse function(s) for recovery of combined peer discovery information 506. In some embodiments, data/information 500 also includes information for generating a peer discovery signal header and/or information for recovering information from a peer discovery signal header 508.

Frequency timing structure information 502 includes peer discovery resource information 510 which includes resource unit to peer discovery identifier mapping information 512. In some embodiments, information 502 further includes one or more of: information identifying which resource units are dedicated relay units 514 and information identifying resource unit information which is to be combined in which of the dedicated relay units.

Predetermined peer discovery combining function(s) 504 includes predetermined peer discovery combining function 1 information 518. In some embodiments, there are a plurality of alternative combining functions which are used and/or which may be selected, and information 504 includes predetermined peer discovery combining function n information 520. Predetermined inverse function(s) for recovering peer discovery information 506 includes predetermined inverse function 1 information 522. In some embodiments, there are a plurality of alternative inverse functions which are used and/or which may be selected, and information 506 includes predetermined inverse function n information 524. Inverse function 1 is an inverse function corresponding to predetermined peer discovery combining function 1. Inverse function n is an inverse function corresponding to predetermined peer discovery combining function n.

Information 508 includes one or more of: own/combined (O/C) flag information 526, combining function ID to combining function mapping information and combining input information. For example, O/C flag information 526 indicates that if the O/C flag is set to 0 the peer discovery signal is carrying peer discovery information pertaining to the device which is transmitting the peer discovery signal, and if the O/C is set to 1 the peer discovery signal is carrying a combined peer discovery information corresponding to two or more other peer devices and the signal is a relay signal. Combining function ID to combining function mapping information identifies different bit patterns used to identify the different alternative peer discovery combing function which may be used. Combining input ID information 530 includes, e.g., information used to identify which peer discovery resource units the combined information corresponds to.

Various aspects and/or features of some, but not necessarily all, embodiments, are described below. In some embodiments an exemplary method includes using one or more exemplary nodes which function as relay nodes with enhanced capabilities. The exemplary enhanced relay nodes, instead of simply re-transmitting the exact bits that they decode, in some embodiments, may, and sometimes do, perform a more complex operation on a plurality of peer discovery signals that they have previously received and decoded from a plurality of peers. In one exemplary embodiment, each peer in the network that is participating in peer discovery has an assigned time-frequency resource unit. A peer may decide to use this resource unit to either broadcast its discovery signal or to broadcast a signal that is based on a function of a set of peer discovery signals previously received from other peer devices.

Figure 6:
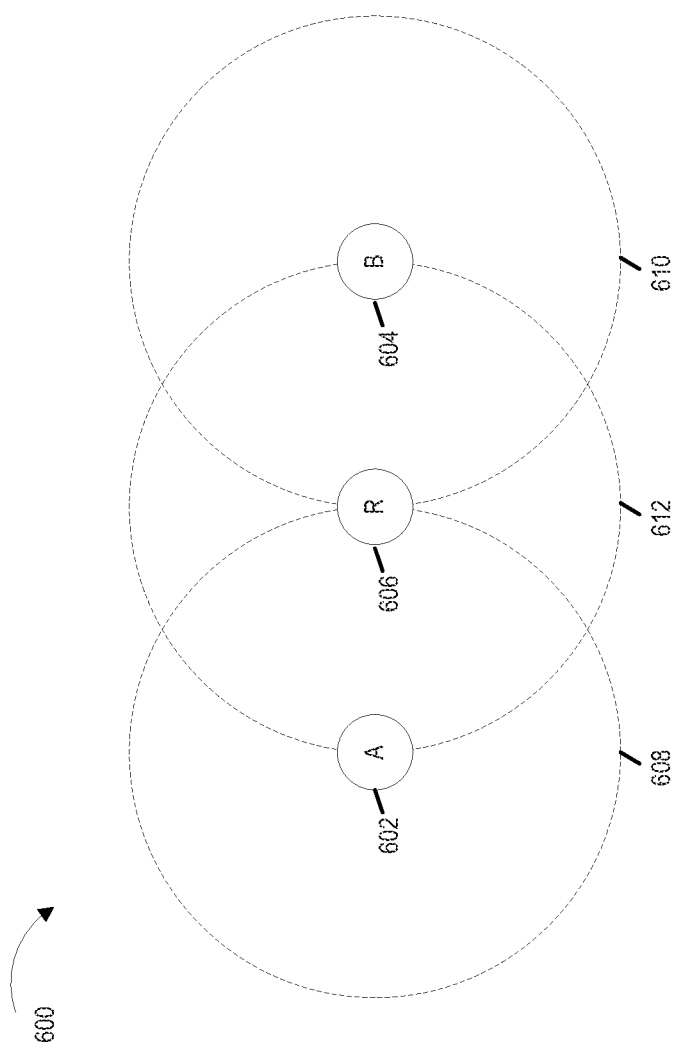
FIG. 6 is a drawing illustrating three exemplary wireless devices and is used to illustrate communication of combined discovery information in accordance with various embodiments.

For example, consider the following scenario, depicted in drawing 600 of FIG. 6. Peers A and B (602, 604) are too far apart to decode each other's discovery messages. However, peer R 606 is in a position to decode both A's discovery message and B's discovery message. Let X_A and X_B denote the bit vectors corresponding to the discovery messages of node A and B. Using the relaying approach using simple retransmission, peer R 606 may transmit peer X_A in a first resource unit and then transmit X_B in a second resource unit. Denoting the transmission of node R in resource units 1 and 2 by X_R(1) and X_R(2), we have that X_R(1)=X_A and X_R(2)=X_B. That way, both node A 602 and node B 604 may discover each other, after both transmissions of node R 606 are complete. In various exemplary embodiments, node R 606 forms and transmits the linear combination X_R=X_A+X_B, where "+" denotes the bit-wise XOR operation. Since node A 602 knows X_A, it can form X_R+X_A to decode X_B and, since node B 604 knows X_B, it can form X_R+X_B to decode X_A. The result is that both node A 602 and node B 604 can discover each other after one transmission by node R 606. Furthermore, suppose that node R 606 has a message of its own to transmit. Then, in a first resource unit it may transmit this information, followed by transmitting X_A+X_B in the second time unit. In this way, each of the peers in the network (node A 602, node B 604, node R 606) can discover each other using two resource units. By contrast, using the simple direct re-transmission approach, it would take three transmissions by node R 606 to achieve the same result.

Figure 7:
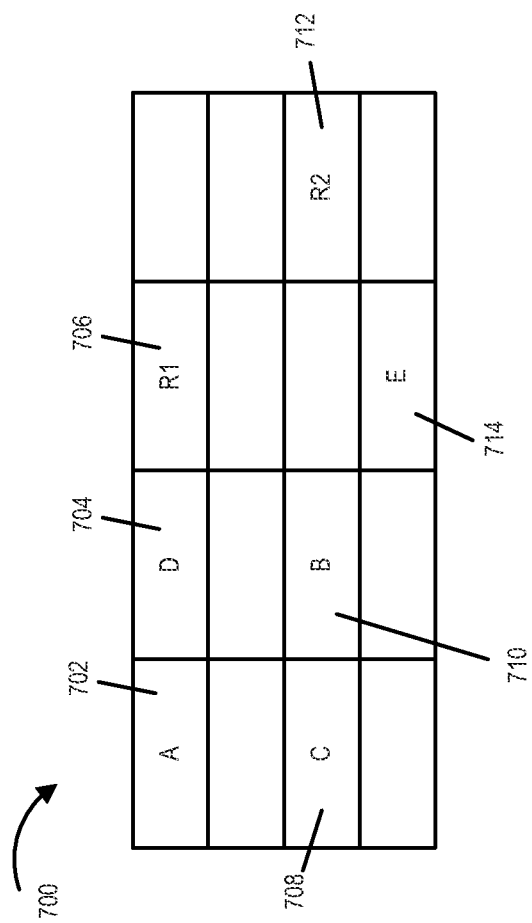
FIG. 7 illustrates an exemplary resource block with 16 exemplary resource units allocated to different wireless devices and is used to explain the relaying of peer discovery information in accordance with various embodiments.

In some embodiments, the said set of peer discovery signals which a relay node may combine and map into a broadcast message is based on the time-frequency unit assigned to the peer performing the relaying and given by a pre-determined mapping known to each of the peers in advance. This is possible due to synchronization in the wireless network which enables each of the peers to share a common notion of time and, therefore, the ability to index each of the time-frequency resource units available for the network. For an exemplary embodiment, consider the following example of the mapping between the resource-units:

Consider that there are seven devices (node A, node B, node C, node D, node E, node R1 and node R2) in an exemplary peer to peer network. The resource units are time-frequency slots, i.e., rows are different frequencies, columns are different symbol times. Drawing 700 of FIG. 7 illustrates an exemplary resource block with 16 exemplary resource units. Each of the devices (node A, node B, node C, node D, node E, node R1, node R2) are assigned different, e.g., orthogonal, resource units (resource unit A 702, resource unit B 710, resource unit C 708, resource unit D 704, resource unit E 714, resource unit R1 706, resource unit R2 712), respectively. Each device knows its assigned resource unit before transmission by virtue of network-wide synchronization. The mapping is defined as follows: the resource unit 706 assigned to peer R1 may be used by that peer to transmit a relay signal based on the discovery signals that it receives in resource units (702, 710) assigned to devices A and B, respectively. Similarly, peer R2 may transmit in its assigned resource unit 712 a signal that is based on the signal that it receives in resource units (708, 710, 714) corresponding to peers C, D and E, respectively.

Let the messages carried in resource units A, B, C, D, E, R1 and R2 (702, 710, 708, 704, 714, 706 and 712) be denoted by X_A, X_B, X_C, X_D, X_E, X_R1 and X_R2. In one embodiment, the message transmitted by R1 may be a linear combination, over a Galois field of certain size, of the messages transmitted in resource units A and B (702, 710). Using the above notation, this can be written as X_R1=alpha_A*X_A+alpha_B*X_B, where * and + denote the multiplication and addition operations in the chosen Galois field. In the example of FIG. 7, the Galois field is of size 2 and the operations are bit-wise AND and XOR. The decoding operation in the general case becomes a matrix inversion operation, where the matrix is composed of the coefficients in the linear combinations transmitted by a plurality of relay nodes. A given peer can decode the individual discovery messages embedded in the linear combinations if the said matrix is full rank. Furthermore, the coefficients alpha_A and alpha_B that are used to multiply the messages of node A and B may also be predetermined and mapped to the indices of the resource units occupied by A and B. Due to synchronization in the network, this mapping may be, and in some embodiments, is known to each of the devices a priori. Both the resource unit mapping and the coefficients may, and in some embodiments, do vary over time according to a predetermined hopping pattern which is a priori known to each of the devices.

The benefit of network-wide synchronization is that it allows the resource unit mapping and coefficient matrices to be known a prior by each of the nodes in the network without the need for any explicit signaling. Hence, the overhead cost of the scheme is minimized. In some embodiments, a peer indicates whether it is using the given resource unit to transmit its own discovery message or a linear combination of other peer's messages. In some such embodiments, this is done using so-called "format bits" in a peer discovery channel of a peer to peer signaling protocol. In some such embodiments, the format bits proceed the message payload of the given resource unit.

Figure 8:
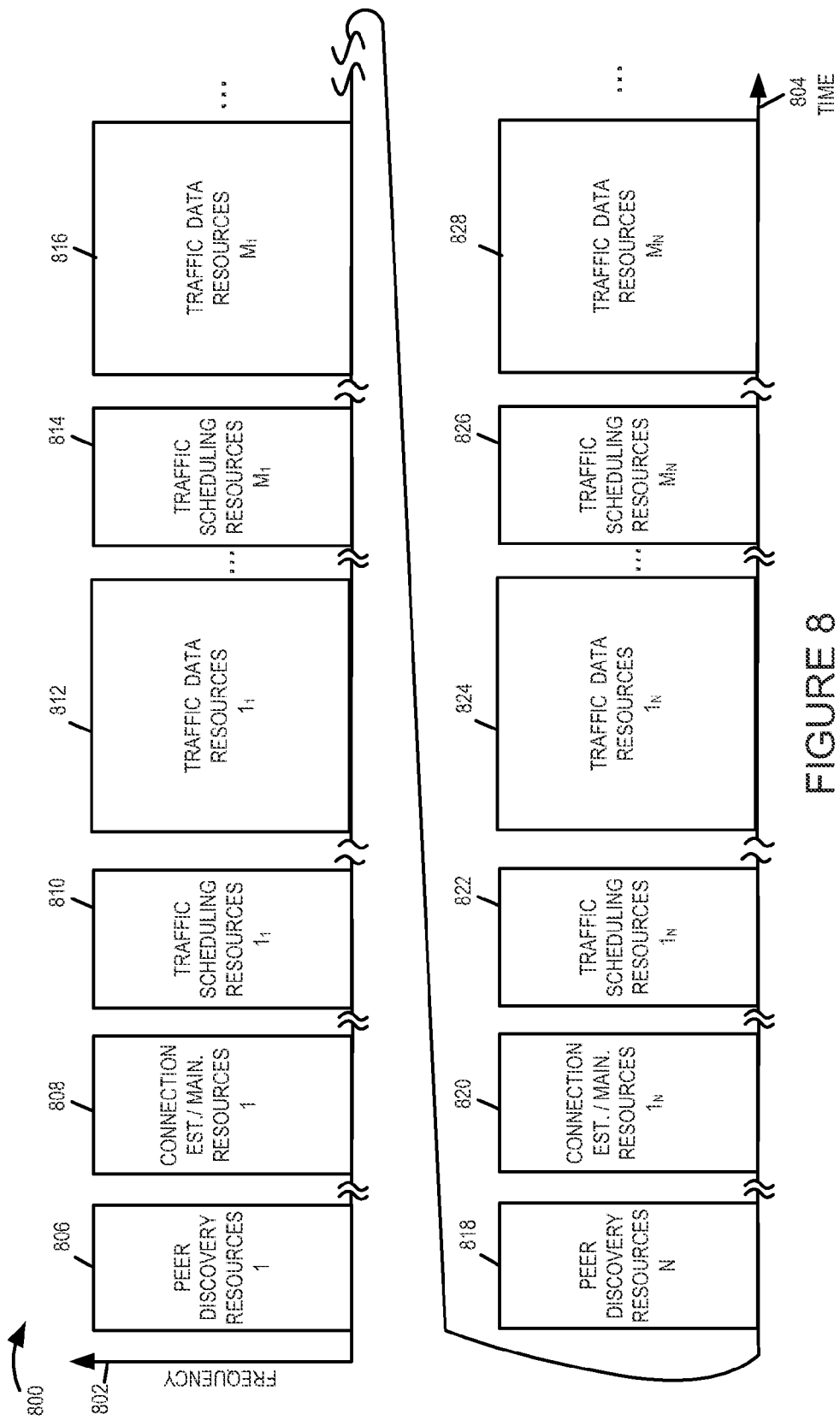
FIG. 8 is a drawing of an exemplary recurring frequency-timing structure including peer discovery resource blocks in accordance with various embodiments.

FIG. 8 is a drawing of an exemplary recurring frequency-timing structure 800 in accordance with various embodiments. Vertical axis 802 represents frequency, e.g., OFDM tones, and horizontal axis 804 represent time, e.g., OFDM symbol transmission time intervals. Exemplary recurring frequency-timing structure includes a plurality of sets of resources, each set including peer discovery resources, connection establishment/connection maintenance resources, traffic scheduling resources and corresponding traffic data resources. The peer to peer discovery resources are used for carrying signals, e.g., broadcast signals, conveying peer discovery information. At least some of the signals conveying peer discovery information may be, and sometimes are, relay signals including peer discovery information which has been combined from multiple peer devices. The connection establishment/connection maintenance resources are used to carry signals for establishing and/or maintaining peer to peer connections. The traffic scheduling resources are used to carry peer to peer traffic transmission scheduling signals corresponding to established peer to peer connections, e.g., peer to peer transmission request signals and peer to peer transmission request response signals. The traffic data resources, e.g., peer to peer traffic segments, are used to carry peer to peer traffic signals corresponding to peer to peer connections which have been scheduled to use the resource. Exemplary recurring frequency-timing structure 800 includes: peer discovery resources $1_1$ 806, connection establishment/connection maintenance resources $1_1$ 808, traffic scheduling resources $1_1$ 810, traffic data resources $1_1$ 812, traffic scheduling resource $M_1$ 814, traffic data resources $M_1$ 816, ..., peer discovery resources N 818, connection establishment/connection maintenance resources $1_N$ 820, traffic scheduling resources $1_N$ 822, traffic data resources $1_N$ 824, traffic scheduling resources $M_N$ 826 and traffic data resources $M_N$ 828.

Figure 9:
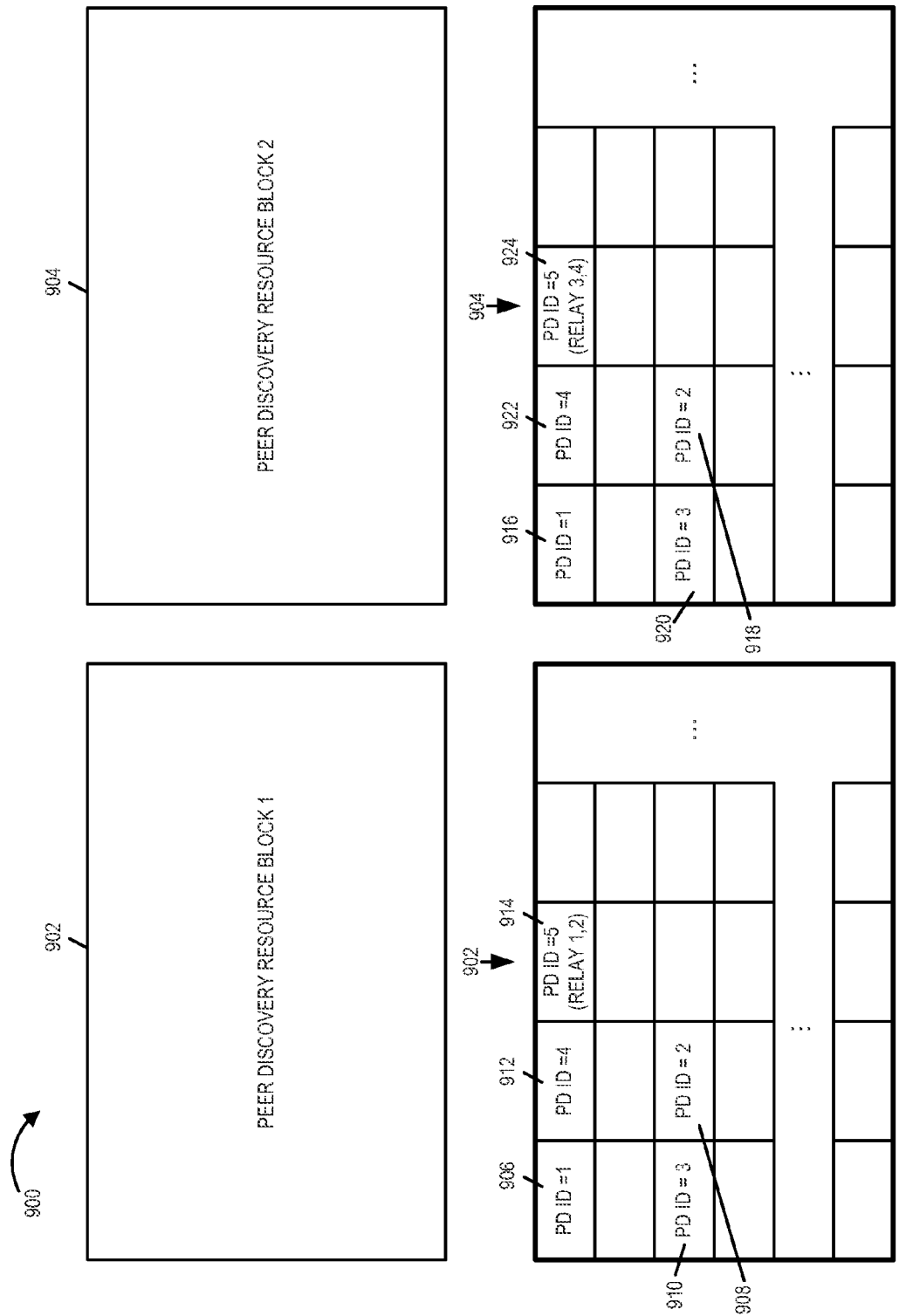
FIG. 9 is a drawing of two exemplary peer discovery resources blocks in accordance with various embodiments.

FIG. 9 is a drawing 900 of two exemplary peer discovery resources blocks (peer discovery resource block 1 902, peer discovery resource block 2 904). The exemplary peer discovery resource blocks (902, 904) are, e.g., any of the N peer discovery resources (peer discovery resources 1 806, ..., peer discovery resources N 818) of exemplary structure 800 of FIG. 8. Peer discovery resource block 902 includes a plurality of predetermined resources corresponding to different peer discovery identifiers. In this example, some of the peer discovery resources are dedicated to be used for relaying combined information corresponding to other peer discovery resources.

Peer discovery resource block 1 902 includes: resource 906 corresponding to peer discovery identifier=1 (PD ID=1), resource 908 corresponding to peer discovery identifier=2, resource 910 corresponding to peer discovery identifier=3, resource 912 corresponding to peer discovery identifier=4, and resource 914 corresponding to peer discovery identifier=5. Each of the peer discovery resources (906, 908, 910, 912) can be used to carry peer discovery information corresponding to the communications device which has acquired and holds the peer discovery identifier (1, 2, 3, 4) respectively. Peer discovery resource 914 corresponding to peer discovery identifier 5 can be used to carry a relay signal conveying combined peer discovery information corresponding to peer discovery identifiers 1 and 2, e.g., a predetermined combination of information communicated in resources (906, 908). In some embodiments, the combination is a linear combination in a Galois field. In various embodiments, the combining is performed in a predetermined manner.

Peer discovery resource block 2 904 includes: resource 916 corresponding to peer discovery identifier=1, resource 918 corresponding to peer discovery identifier=2, resource 920 corresponding to peer discovery identifier=3, resource 922 corresponding to peer discovery identifier=4, and resource 924 corresponding to peer discovery identifier=5. Each of the peer discovery resources (916, 918, 920, 922) can be used to carry peer discovery information corresponding to the communications device which has acquired and holds the peer discovery identifier (1, 2, 3, 4) respectively. Peer discovery resource 924 corresponding to peer discovery identifier 5 can be used to carry a relay signal conveying combined peer discovery information corresponding to peer discovery identifiers 3 and 4, e.g., a predetermined combination of information communicated in resources (920, 922). In some embodiments, the combination is a linear combination in a Galois field. In various embodiments, the combining is performed in a predetermined manner.

FIGS. 10-16 illustrate an example in which wireless communications devices, e.g., mobile nodes, communicate peer discovery information in accordance with various embodiments. Consider that the exemplary wireless communications devices of the example of FIGS. 10-16 include stored frequency/timing structure information including information identifying predetermined peer discovery resources including exemplary peer discovery resource block 1 902 and exemplary peer discovery resource block 2 904 of FIG. 9. Also, consider that the wireless devices have a predetermined understanding as to the combining function used to combine the information which is relayed in the peer discovery resources (914, 924) used for relaying combined peer discovery information.

Figure 10:
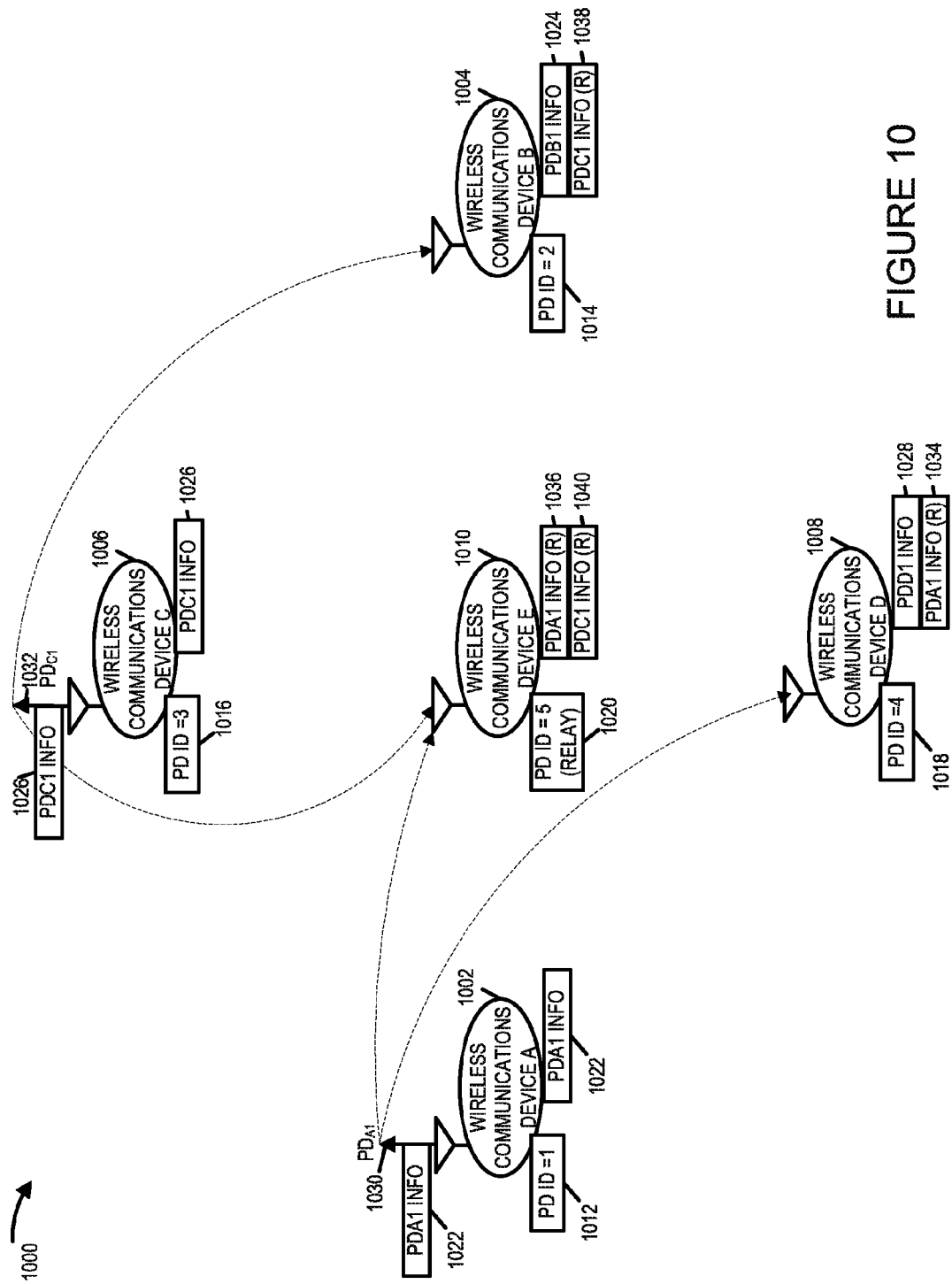
FIG. 10 is a first drawing in a first sequence of drawings used to illustrate the communication of peer discovery information including the communication of combined peer discovery information from multiple peers in accordance with an exemplary embodiment.

Drawing 1000 of FIG. 10 illustrates five exemplary wireless communications devices (wireless communications device A 1002, wireless communications device B 1004, wireless communications device C 1006, wireless communications device D 1008, wireless communications device E 1010). The wireless communications devices (1002, 1004, 1006, 1008, 1010) are, e.g., any of the wireless communications devices of system 100 of FIG. 1. The wireless communications devices (1002, 1004, 1006, 1008, 1010) are, e.g., implemented in accordance with device 300 of FIG. 3 and/or implemented to be able to implement a method in accordance with flowchart 200 of FIG. 2.

Consider that wireless communications device A 1002 and wireless communications device B 1004 are outside direct peer to peer communications range of one another. Further consider that wireless communications device C 1006 and wireless communications device D 1008 are outside direct peer to peer communications range of one another. The wireless communications devices (1002, 1004, 1006, 1008, 1010) have acquired peer discovery resources identifiers (1, 2, 3, 4, 5) respectively as indicated by boxes (1012, 1014, 1016, 1018), respectively. Specific peer discovery resources in the peer to peer frequency timing structure correspond to each of the peer discovery identifiers. Device A 1002 is allowed to transmit its own peer discovery information on the resources corresponding to peer discovery identifier 1. Device B 1004 is allowed to transmit its own peer discovery information on the resources corresponding to peer discovery identifier 2. Device C 1006 is allowed to transmit its own peer discovery information on the resources corresponding to peer discovery identifier 3. Device D 1008 is allowed to transmit its own peer discovery information on the resources corresponding to peer discovery identifier 4. Device E 1010 is allowed to transmit combined peer discovery relay information on the resources corresponding to peer discovery identifier 5.

Wireless communications devices (device A 1002, device B 1004, device C 1006, device D 1008) includes peer discovery information (peer discovery (PD) A1 information 1022, peer discovery B1 information 1024, peer discovery C1 information 1026, peer discovery D1 information 1028) that it intends to transmit on its allocated resource in peer discovery resource block 1 902. Wireless communications device A 1002 generates peer discovery signals $PD_{A1}$ 1030 including PDA1 information 1022 and transmits, e.g., broadcasts, the generated signal 1030 using resource 906. Wireless communications device C 1006 generates peer discovery signals $PD_{C1}$ 1032 including PDC1 information 1026 and transmits, e.g., broadcasts, the generated signal 1032 using resource 910. Transmitted signal PDA1 1030 is received by devices (device D 1008, device E 1010) which recover the communicated PDA1 information and store the received recovered information as indicated by blocks (1034, 1036), respectively. Transmitted signal $PD_{C1}$ 1032 is received by devices (device B 1004, device E 1010) which recover the communicated PDC1 information and store the received recovered information as indicated by blocks (1038, 1040), respectively.

Figure 11:
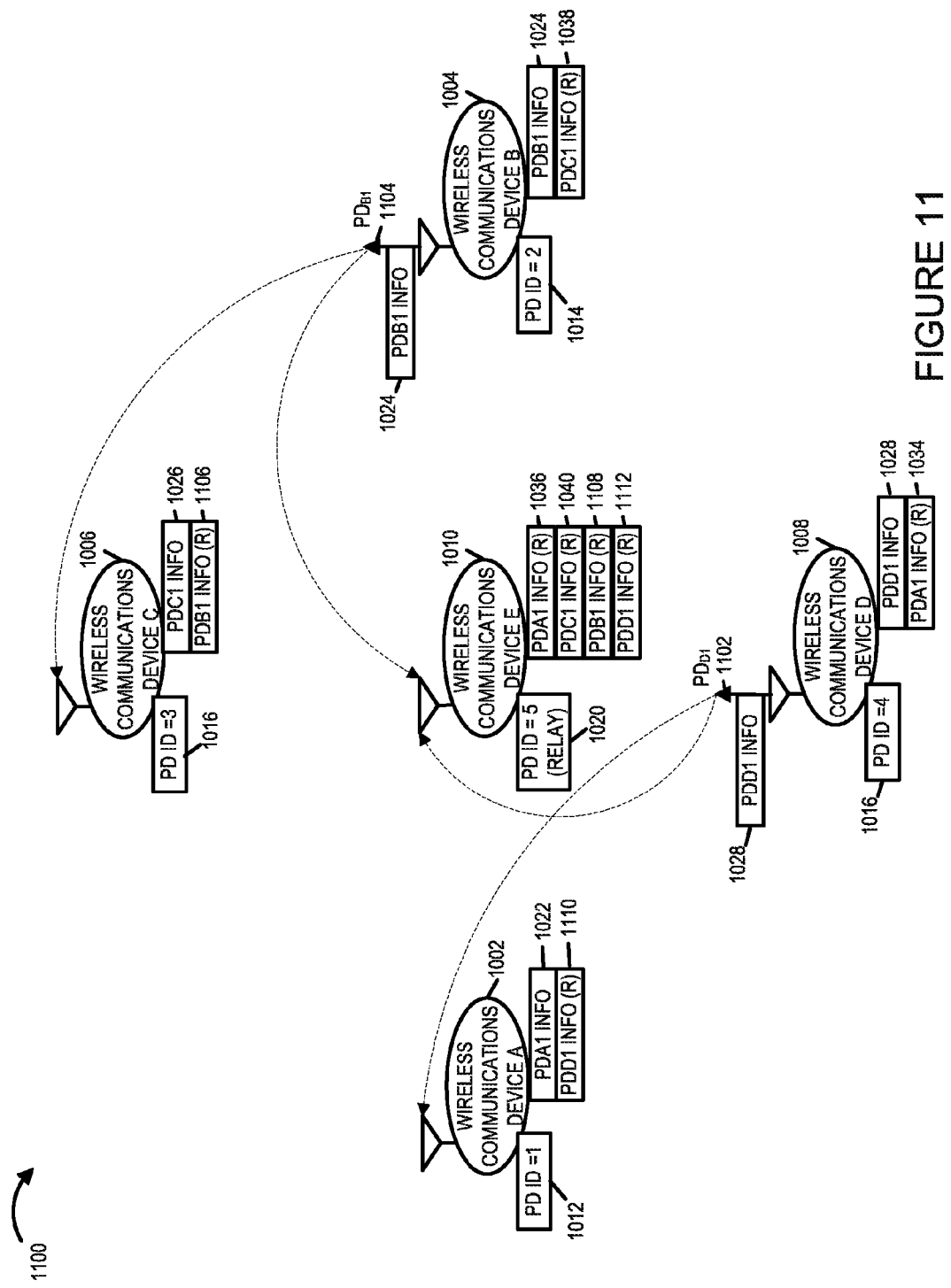
FIG. 11 is a second drawing in a first sequence of drawings used to illustrate the communication of peer discovery information including the communication of combined peer discovery information from multiple peers in accordance with an exemplary embodiment.

The example of FIG. 10 continues in drawing 1100 of FIG. 11. Wireless communications device D 1008 generates peer discovery signals $PD_{D1}$ 1102 including PDD1 information 1028 and transmits, e.g., broadcasts, the generated signal 1102 using resource 912. Wireless communications device B 1004 generates peer discovery signals $PD_{B1}$ 1104 including PDB1 information 1024 and transmits, e.g., broadcasts, the generated signal 1104 using resource 908. Transmitted signal $PD_{D1}$ 1102 is received by devices (device A 1002, device E 1010) which recover the communicated PDD1 information and store the received recovered information as indicated by blocks (1110, 1112), respectively. Transmitted signal $PD_{B1}$ 1104 is received by devices (device C 1006, device E 1010) which recover the communicated PDB1 information and store the received recovered information as indicated by blocks (1106, 1108), respectively.

Figure 12:
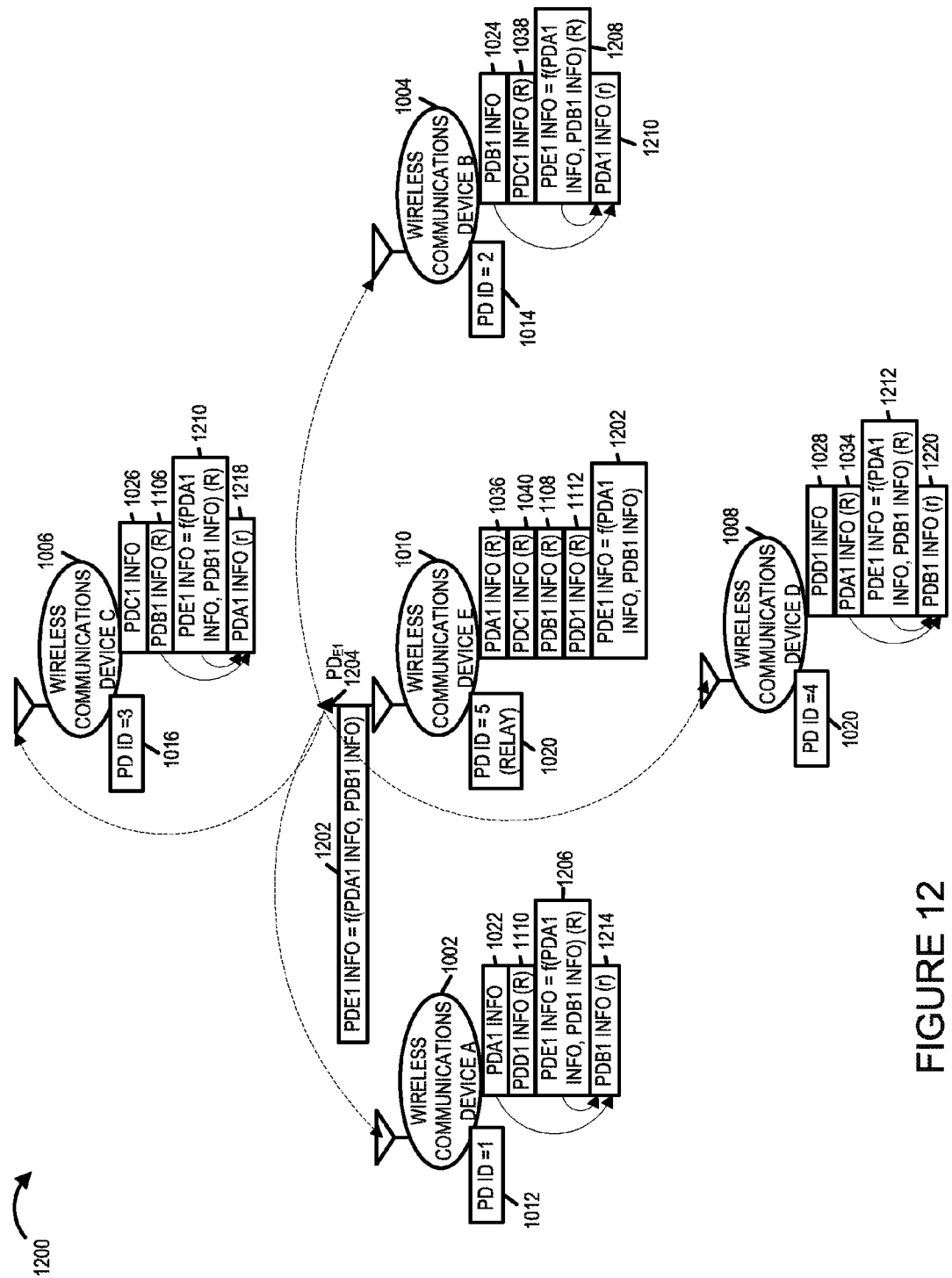
FIG. 12 is a third drawing in a first sequence of drawings used to illustrate the communication of peer discovery information including the communication of combined peer discovery information from multiple peers in accordance with an exemplary embodiment.

The example of FIG. 11 continues in drawing 1200 of FIG. 12. Wireless communications device E 1110 combines the received peer discovery information from device A 1002 and device C 1006 in accordance with a predetermined combining function to generate peer discovery information PDE1 1202, where PDE1 information=f(PDA1 info, PDB1 info). In various embodiments, the combining is performed in a predetermined manner. In some embodiments, device E 1010 performs a linear combination in a Galois field. Wireless communications device E 1010 generates signal $PD_{E1}$ 1204, which includes PDE1 information 1202, and transmits, e.g., broadcasts, the generated signal 1204. Transmitted signal $PD_{E1}$ 1204 is received by devices (device A 1002, device B 1004, device C 1006, device D 1008) which recover the communicated PDE1 information and store the received recovered information as indicated by blocks (1206, 1208, 1210, 1212), respectively.

Device A 1002 processes the received combined information PDE1 1206, using an inverse function to the function used to generate the combined information PDE1, to recover the peer discovery information from device B, the PDB1 information, as indicated by block 1214. Note that device A 1002 has a stored copy of PDA1 information, info 1022, which is utilized by the inverse function to perform the recovery.

Device B 1004 processes the received combined information PDE1 1208, using an inverse function to the function used to generate the combined information PDE1, to recover the peer discovery information from device A, the PDA1 information, as indicated by block 1210. Note that device B 1004 has a stored copy of PDB1 information, info 1024, which is utilized by the inverse function to perform the recovery.

Device C 1006 processes the received combined information PDE1 1210, using an inverse function to the function used to generate the combined information PDE1, to recover the peer discovery information from device A, the PDA1 information, as indicated by block 1218. Note that device C 1006 has a stored copy of PDB1 information, info 1106, which is utilized by the inverse function to perform the recovery.

Device D 1008 processes the received combined information PDE1 1212, using an inverse function to the function used to generate the combined information PDE1, to recover the peer discovery information from device B, the PDB1 information, as indicated by block 1220. Note that device D 1008 has a stored copy of PDA1 information, info 1034, which is utilized by the inverse function to perform the recovery.

Figure 13:
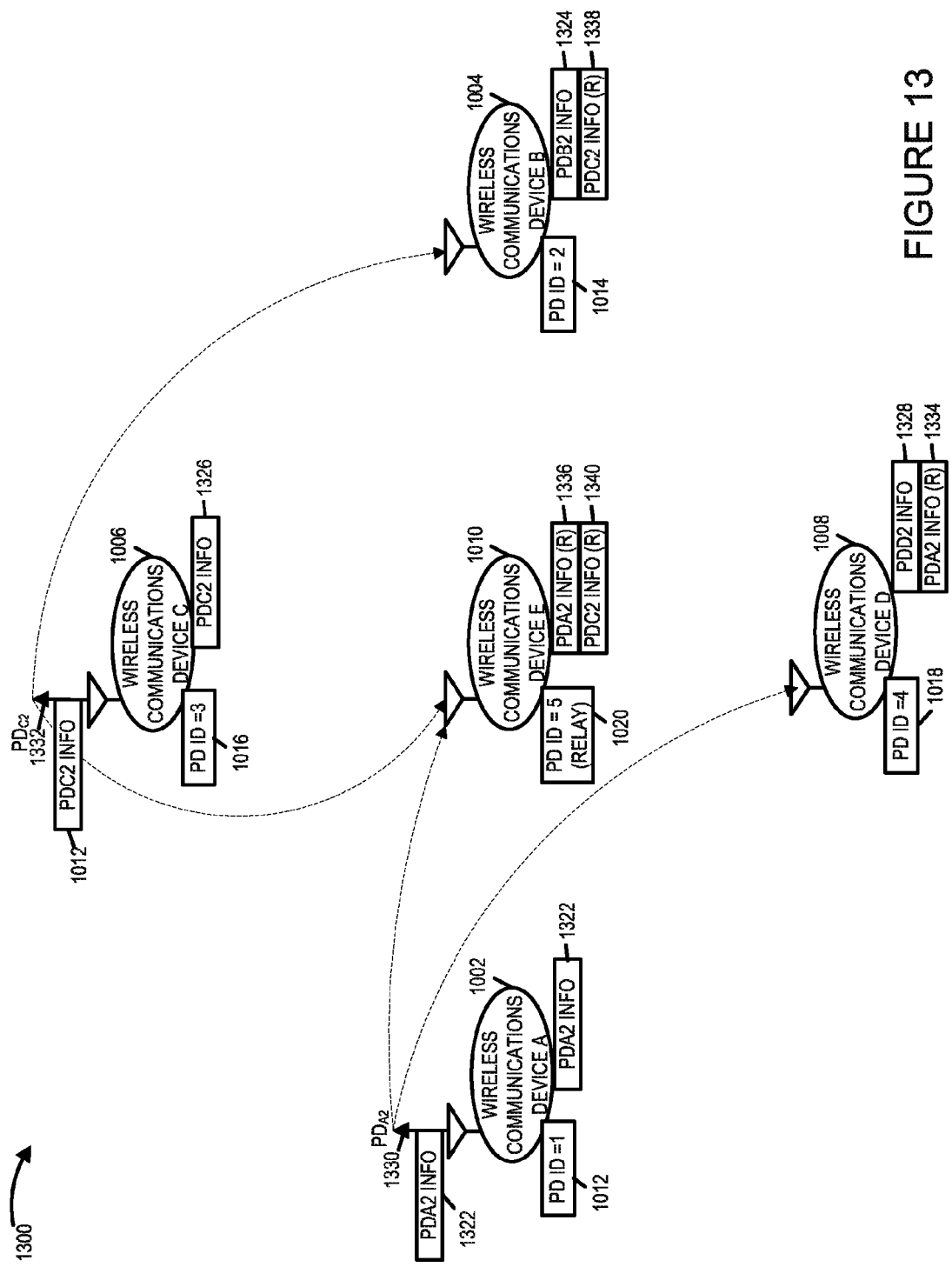
FIG. 13 is a fourth drawing in a first sequence of drawings used to illustrate the communication of peer discovery information including the communication of combined peer discovery information from multiple peers in accordance with an exemplary embodiment.

The example, of FIG. 12 continues with drawing 1300 of FIG. 13. Wireless communications devices (device A 1002, device B 1004, device C 1006, device D 1008) includes peer discovery information (peer discovery (PD) A2 information 1322, peer discovery B2 information 1324, peer discovery C2 information 1326, peer discovery D2 information 1328) that it intends to transmit on its allocated resource in peer discovery resource block 2 904. Wireless communications device A 1002 generates peer discovery signals $PD_{A2}$ 1330 including PDA2 information 1322 and transmits, e.g., broadcasts, the generated signal 1330 using resource 916. Wireless communications device C 1006 generates peer discovery signals $PD_{C2}$ 1332 including PDC2 information 1326 and transmits, e.g., broadcasts, the generated signal 1332 using resource 920. Transmitted signal $PD_{A2}$ 1330 is received by devices (device D 1008, device E 1010) which recover the communicated PDA2 information and store the received recovered information as indicated by blocks (1334, 1336), respectively. Transmitted signal $PD_{C2}$ 1332 is received by devices (device B 1004, device E 1010) which recover the communicated PDC2 information and store the received recovered information as indicated by blocks (1338, 1340), respectively.

Figure 14:
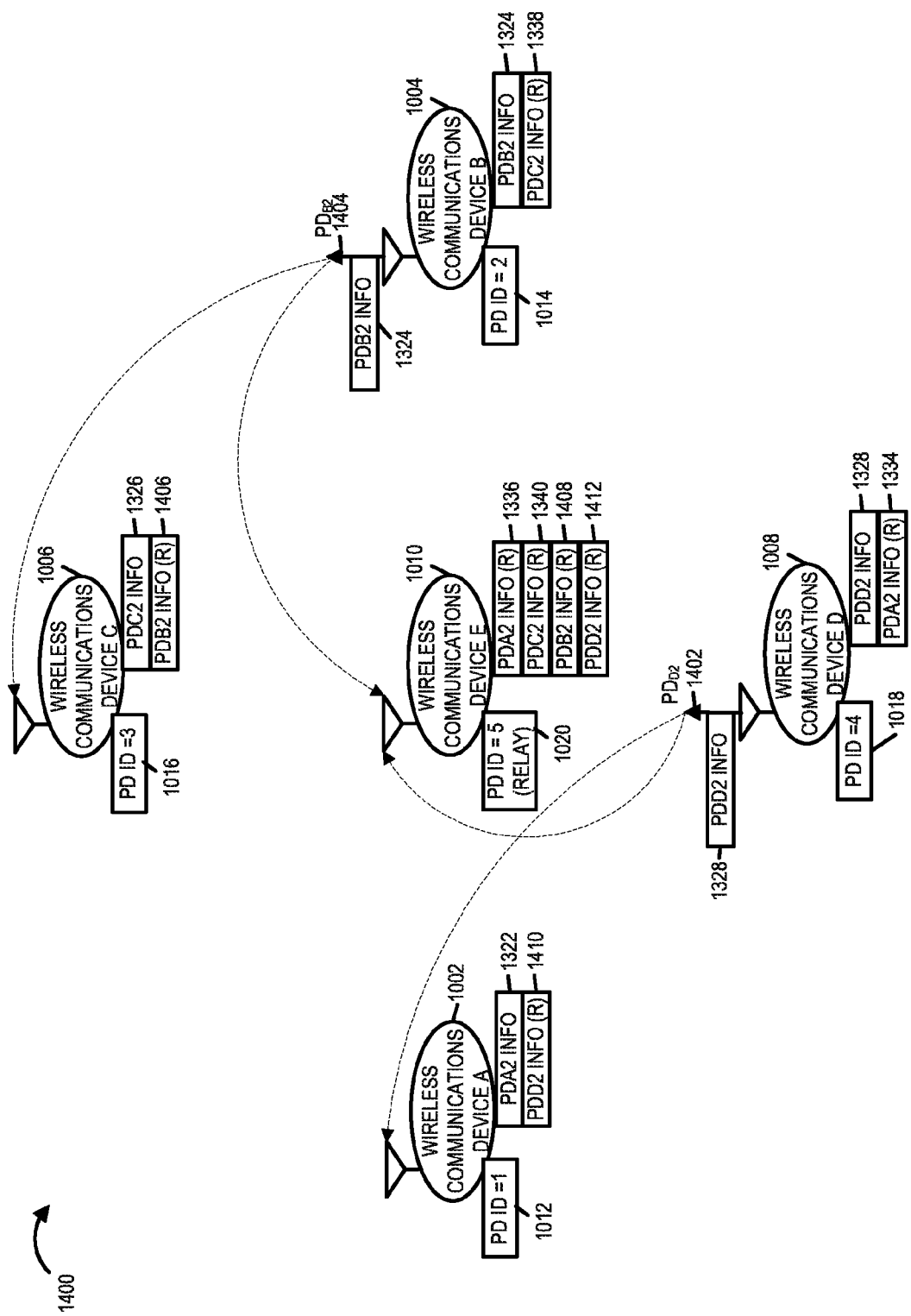
FIG. 14 is a fifth drawing in a first sequence of drawings used to illustrate the communication of peer discovery information including the communication of combined peer discovery information from multiple peers in accordance with an exemplary embodiment.

The example of FIG. 13 continues in drawing 1400 of FIG. 14. Wireless communications device D 1008 generates peer discovery signals $PD_{D2}$ 1402 including PDD2 information 1328 and transmits, e.g., broadcasts, the generated signal 1402 using resource 922. Wireless communications device B 1004 generates peer discovery signals $PD_{B2}$ 1404 including PDB2 information 1324 and transmits, e.g., broadcasts, the generated signal 1404 using resource 918. Transmitted signal $PD_{D2}$ 1402 is received by devices (device A 1002, device E 1010) which recover the communicated PDD2 information and store the received recovered information as indicated by blocks (1410, 1412), respectively. Transmitted signal $PD_{B2}$ 1404 is received by devices (device C 1006, device E 1010) which recover the communicated PDB2 information and store the received recovered information as indicated by blocks (1406, 1408), respectively.

Figure 15:
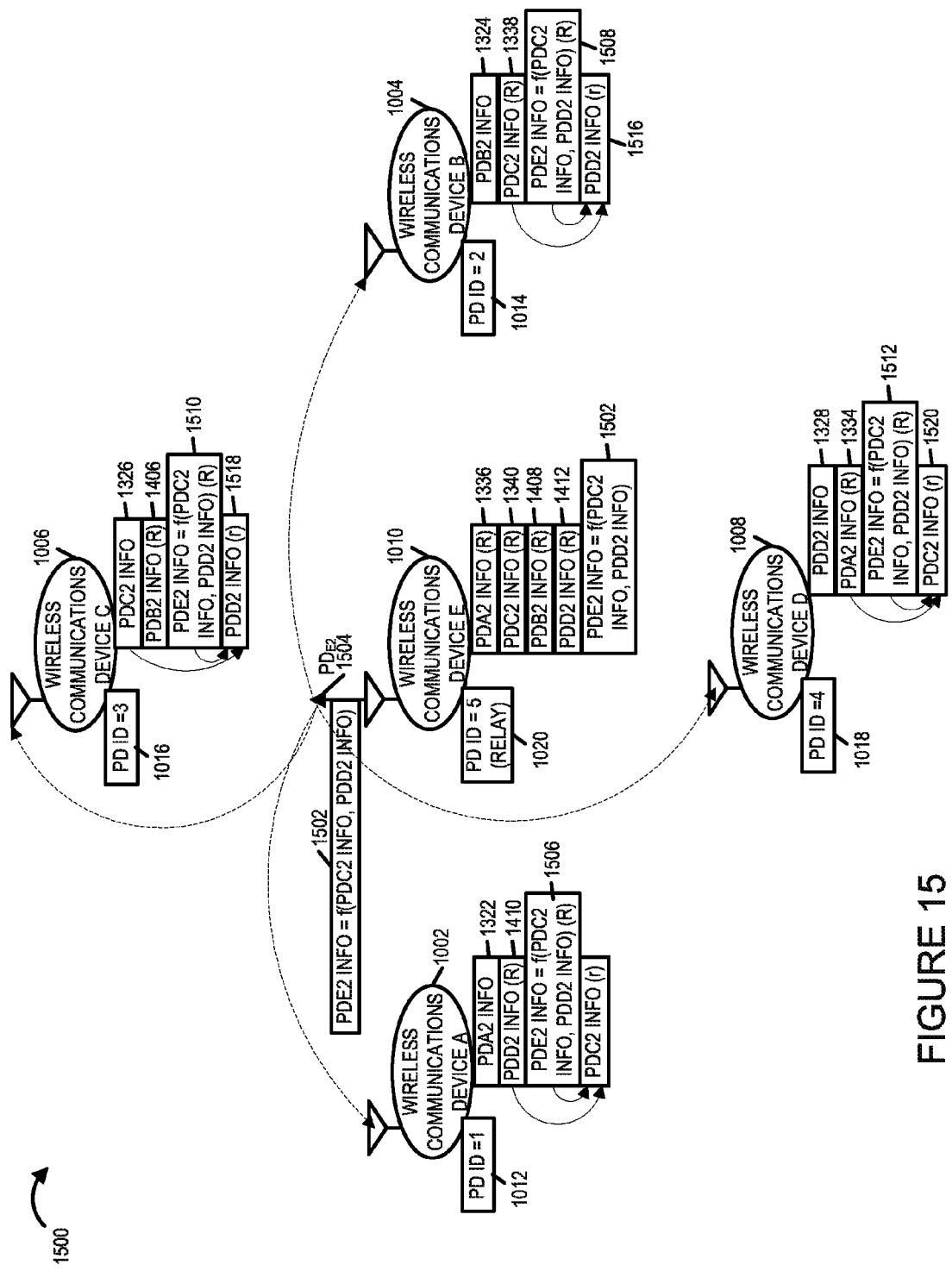
FIG. 15 is a sixth drawing in a first sequence of drawings used to illustrate the communication of peer discovery information including the communication of combined peer discovery information from multiple peers in accordance with an exemplary embodiment.

The example of FIG. 14 continues in drawing 1500 of FIG. 15. Wireless communications device E 1010 combines the received peer discovery information from device C 1006 and device D 1008 in accordance with a predetermined combining function to generate peer discovery information PDE2 1502, where PDE2 information=f(PDC2 info, PDD2 info). In various embodiments, the combining is performed in a predetermined manner. In some embodiments, device E 1010 performs a linear combination in a Galois field. Wireless communications device E 1010 generates signal $PD_{E2}$ 1504, which includes PDE2 information 1502, and transmits, e.g., broadcasts, the generated signal 1504. Transmitted signal $PD_{E2}$ 1504 is received by devices (device A 1002, device B 1004, device C 1006, device D 1008) which recover the communicated PDE2 information and store the received recovered information as indicated by blocks (1506, 1508, 1510, 1512), respectively.

Device A 1002 processes the received combined information PDE2 1506, using an inverse function to the function used to generate the combined information PDE2, to recover the peer discovery information from device C, the PDC2 information, as indicated by block 1514. Note that device A 1002 has a stored copy of PDD2 information 1410, which is utilized by the inverse function to perform the recovery.

Device B 1004 processes the received combined information PDE2 1508, using an inverse function to the function used to generate the combined information PDE2, to recover the peer discovery information from device A, the PDD2 information, as indicated by block 1516. Note that device B 1004 has a stored copy of PDC2 information 1338, which is utilized by the inverse function to perform the recovery.

Device C 1006 processes the received combined information PDE2 1510, using an inverse function to the function used to generate the combined information PDE2, to recover the peer discovery information from device D, the PDD2 information, as indicated by block 1518. Note that device C 1006 has a stored copy of PDC2 information 1326, which is utilized by the inverse function to perform the recovery.

Device D 1008 processes the received combined information PDE2 1512, using an inverse function to the function used to generate the combined information PDE2, to recover the peer discovery information from device C, the PDC2 information, as indicated by block 1520. Note that device D 1008 has a stored copy of PDD2 information 1338, which is utilized by the inverse function to perform the recovery.

Figure 16:
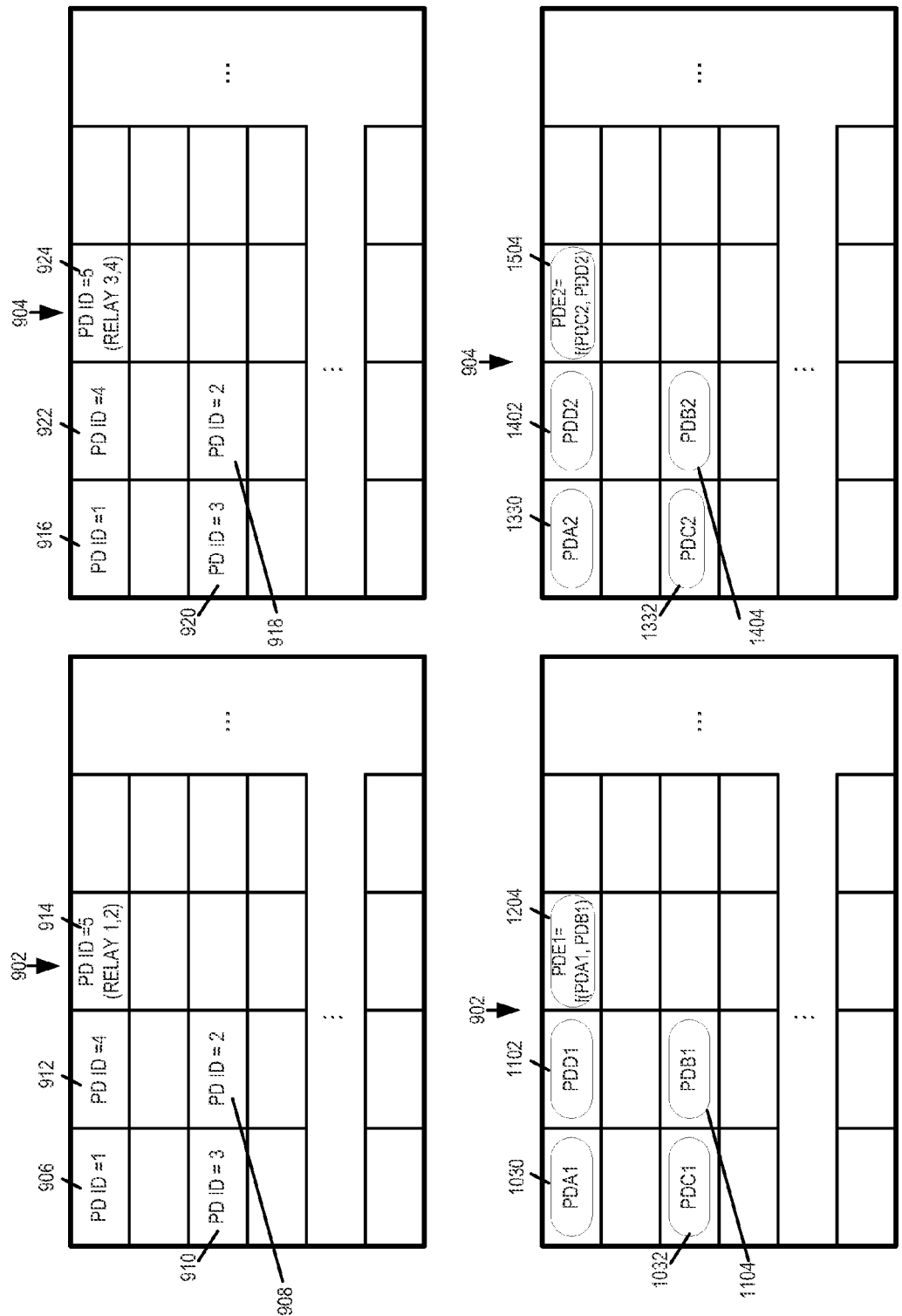
FIG. 16 is a drawing illustrating a mapping of signals generated and transmitted in the example of FIGS. 10-15 to the peer discovery air link resources of FIG. 9.

FIG. 16 is a drawing illustrating exemplary peer discovery link resources, exemplary signals and exemplary information conveyed by the exemplary peer link resources for the example of FIG. 10-15. In peer discovery resource block 1 902, peer discovery resource 906 corresponding to peer discovery identifier=1 conveys peer discovery signal $PD_{A1}$ 1030 which includes peer discovery information PDA1. In peer discovery resource block 1 902, peer discovery resource 910 corresponding to peer discovery identifier=3 conveys peer discovery signal $PD_{C1}$ 1032 which includes peer discovery information PDC1. In peer discovery resource block 1 902, peer discovery resource 912 corresponding to peer discovery identifier=4 conveys peer discovery signal $PD_{D1}$ 1102 which includes peer discovery information PDD1. In peer discovery resource block 1 902, peer discovery resource 908 corresponding to peer discovery identifier=2 conveys peer discovery signal $PD_{B1}$ 1104 which includes peer discovery information PDB1. In peer discovery resource block 1 902, peer discovery resource 914 corresponds to peer discovery identifier=5, and is a resource for relaying combined information corresponding to peer discovery identifies 1 and 2. Peer discovery resource 914 conveys peer discovery signal $PD_{E1}$ 1204 which includes peer discovery information PDE1, where PDE1=f(PDA1, PDB1). Thus information communicated in resource 914 is a function of information communicated in resources 906 and 908.

In peer discovery resource block 2 904, peer discovery resource 916 corresponding to peer discovery identifier=1 conveys peer discovery signal $PD_{A2}$ 1330 which includes peer discovery information PDA2. In peer discovery resource block 2 904, peer discovery resource 920 corresponding to peer discovery identifier=3 conveys peer discovery signal $PD_{C2}$ 1332 which includes peer discovery information PDC2. In peer discovery resource block 2 902, peer discovery resource 922 corresponding to peer discovery identifier=4 conveys peer discovery signal $PD_{D2}$ 1402 which includes peer discovery information PDD2. In peer discovery resource block 2 904, peer discovery resource 918 corresponding to peer discovery identifier=2 conveys peer discovery signal $PD_{B2}$ 1404 which includes peer discovery information PDB2. In peer discovery resource block 2 904, peer discovery resource 924 corresponds to peer discovery identifier=5, and is a resource for relaying combined information corresponding to peer discovery identifies 3 and 4. Peer discovery resource 924 conveys peer discovery signal $PD_{E2}$ 1504 which includes peer discovery information PDE2, where PDE2=f(PDC2, PDD2). Thus information communicated in resource 924 is a function of information communicated in resources 920 and 922.

In the example, of FIG. 10-15, the combining function used is predetermined and known to the wireless devices. In addition, the particular peer discovery resource units whose information is to be combined are predetermined and known to the wireless devices. This approach reduces signaling overhead as there is not a need to communicate the combining function being used or the inputs to the combining function.

In the example, of FIG. 10-15 some of the device (device A 1002, device B 1004, device C 1006, and device D 1008) are observed to transmit their own peer discovery information and receive and process combined peer discovery information from device E 1010. Device E 1010 may also receive and process combined peer discovery information from other peer devices in the system. Thus device E 1010 may transmit a generated peer discovery signal which is a combination of peer discovery information received from other peer devices and then at a later time process a received peer discovery signal from another peer discovery resource unit with an inverse function to obtain a peer discovery message including information corresponding to a plurality of peer devices, said inverse function being an inverse to a combing function used to the generate the received peer discovery signals. Device E may also acquire a peer discovery resource which is used to transmit its own peer discovery information and transit its own peer discovery signal on that resource. Any of the devices (device A 1002, device B 1004, device C 1006, and device D 1008) may also acquire a peer discovery resource dedicated to relaying combined peer discovery information and serve in a similar capability as device E 1010.

Figure 17:
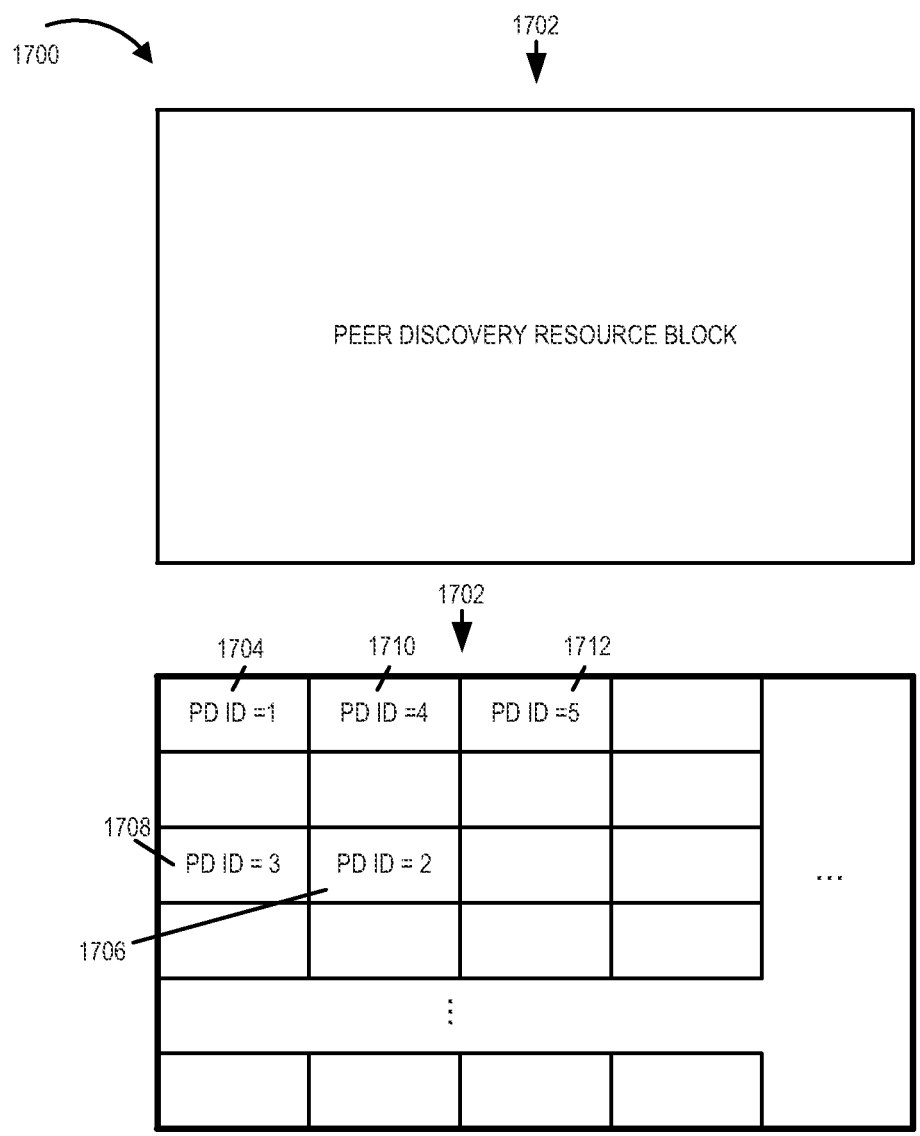
FIG. 17 illustrates an exemplary peer discovery resource block in accordance with various embodiments including peer discovery resource units associated with particular peer discovery identifiers.

FIG. 17 is a drawing 1700 of an exemplary peer discovery resources block 1702 in accordance with various embodiments. The exemplary peer discovery resource block 1702 is, e.g., any of the N peer discovery resources (peer discovery resources 1 806, . . . , peer discovery resources N 818) of exemplary structure 800 of FIG. 8. Peer discovery resource block 1702 includes a plurality of predetermined resources corresponding to different peer discovery identifiers. In this example, at least some of the peer discovery resources can be used for: (i) transmitting peer discovery information pertaining to the transmitting device or (ii) relaying combined information corresponding to other peer discovery resources. In some embodiments, the transmitting device decides whether to transmit its own peer discovery information or whether to transmit combined relay peer discovery information.

Peer discovery resource block 1702 includes: resource 1704 corresponding to peer discovery identifier=1 (PD ID=1), resource 1706 corresponding to peer discovery identifier=2, resource 1708 corresponding to peer discovery identifier=3, resource 1710 corresponding to peer discovery identifier=4, and resource 1712 corresponding to peer discovery identifier=5. Each of the peer discovery resources (1702, 1704, 1706, 1708, 1710, 1712) can be used to carry either (i) peer discovery information corresponding to the communications device which has acquired and holds the peer discovery identifier (1, 2, 3, 4, 5) respectively, or (ii) a relay signal conveying combined peer discovery information corresponding to multiple other peer discovery identifiers. In some embodiments, the combination is a linear combination in a Galois field. In various embodiments, the combining is performed in a predetermined manner. In some embodiments, the combining is performed in one of a predetermined numbers of alternatives, e.g., one of a predetermined number of alternative combining functions is used.

Figure 18:
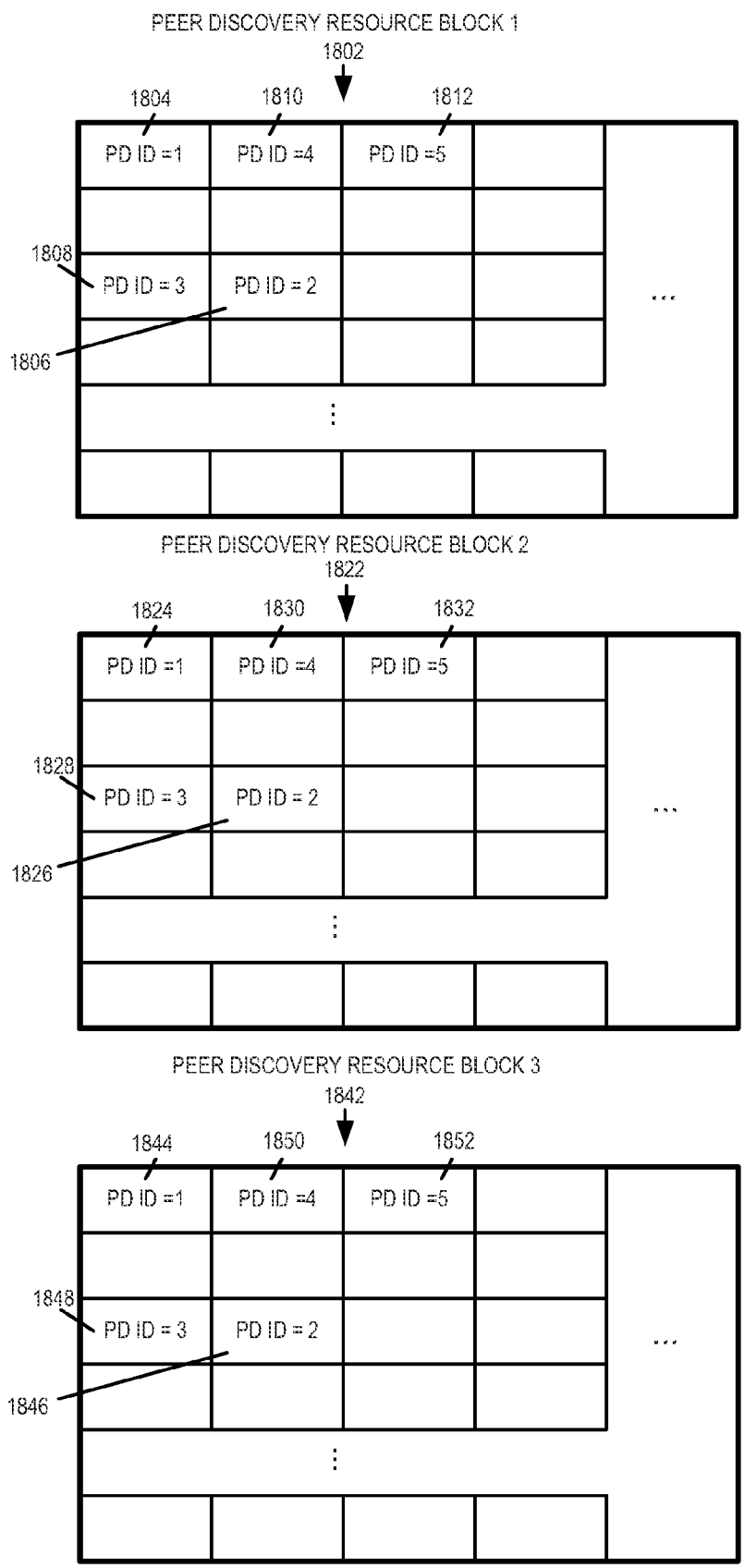
FIG. 18 illustrates three exemplary peer discovery resource blocks in an exemplary recurring frequency-timing structure in accordance with various embodiments including peer discovery resource units associated with particular peer discovery identifiers.

FIG. 18 illustrates three exemplary peer discovery resource blocks (peer discovery resource block 1 1802, peer discovery resource block 2 1822, peer discovery resource block 3 1842) in accordance with an exemplary embodiment. Peer discovery resource block 1802 includes: resource 1804 corresponding to peer discovery identifier=1 (PD ID=1), resource 1806 corresponding to peer discovery identifier=2, resource 1808 corresponding to peer discovery identifier=3, resource 1810 corresponding to peer discovery identifier=4, and resource 1812 corresponding to peer discovery identifier=5. Peer discovery resource block 1822 includes: resource 1824 corresponding to peer discovery identifier=1 (PD ID=1), resource 1826 corresponding to peer discovery identifier=2, resource 1828 corresponding to peer discovery identifier=3, resource 1830 corresponding to peer discovery identifier=4, and resource 1832 corresponding to peer discovery identifier=5. Peer discovery resource block 1842 includes: resource 1844 corresponding to peer discovery identifier=1 (PD ID=1), resource 1846 corresponding to peer discovery identifier=2, resource 1848 corresponding to peer discovery identifier=3, resource 1850 corresponding to peer discovery identifier=4, and resource 1852 corresponding to peer discovery identifier=5.

FIGS. 19-26 illustrate an example in which wireless communications devices, e.g., mobile nodes, communicate peer discovery information in accordance with various embodiments. Consider that the exemplary wireless communications devices of the example of FIGS. 19-26 include stored frequency/timing structure information including information identifying predetermined peer discovery resources including exemplary peer discovery resource block 1 1802, exemplary peer discovery resource block 2 1822 and exemplary peer discovery resource block 3 1842 of FIG. 18. Also, consider that the wireless devices have a predetermined understanding as to a set of alternative predetermined combining functions that may be used and selected to combine the information which is relayed.

Figure 19:
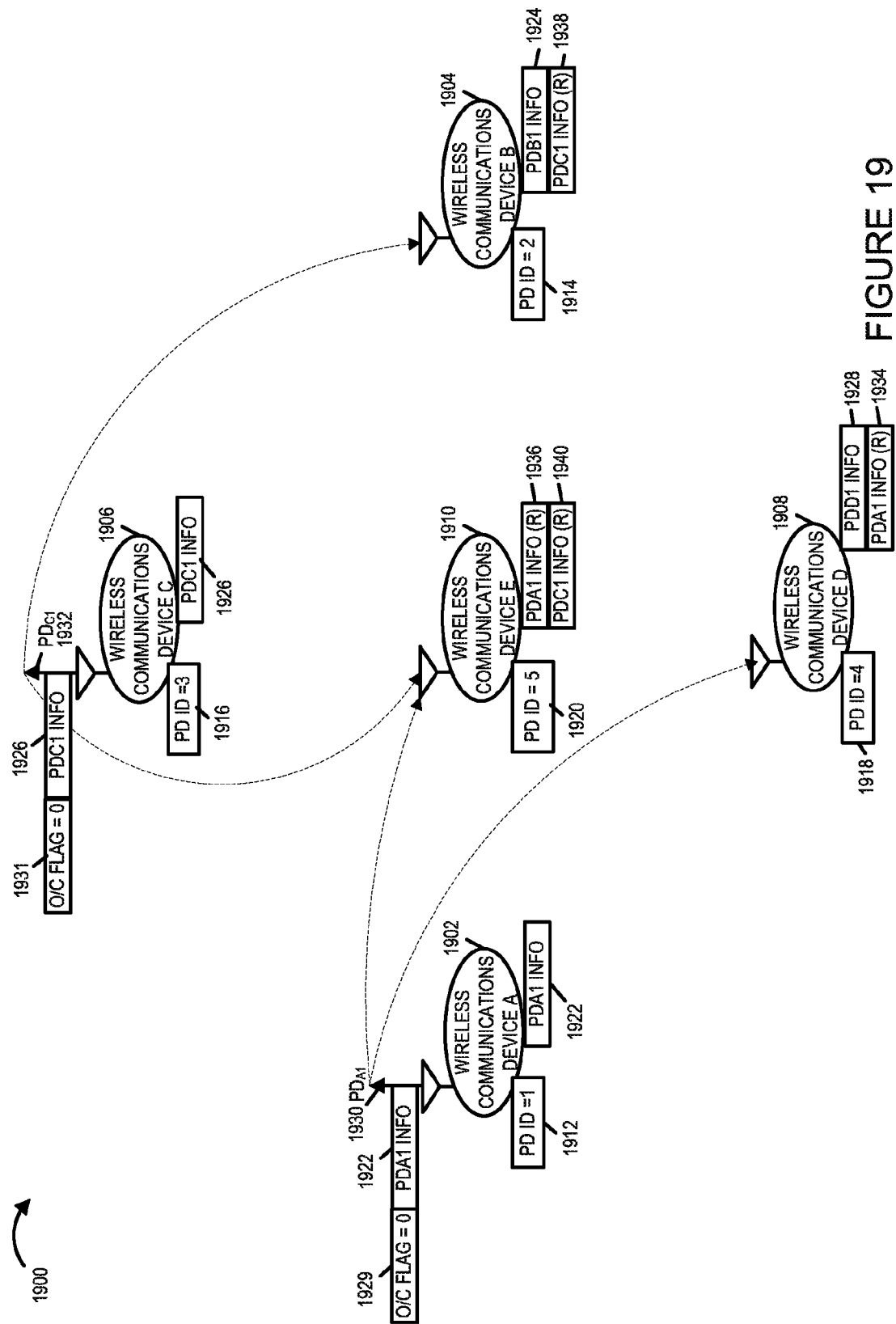
FIG. 19 is a first drawing in a second sequence of drawings used to illustrate the communication of peer discovery information including the communication of combined peer discovery information from multiple peers in accordance with an exemplary embodiment.

Drawing 1900 of FIG. 19 illustrates five exemplary wireless communications devices (wireless communications device A 1902, wireless communications device B 1904, wireless communications device C 1906, wireless communications device D 1908, wireless communications device E 1910). The wireless communications devices (1902, 1904, 1906, 1908, 1910) are, e.g., any of the wireless communications devices of system 100 of FIG. 1. The wireless communications devices (1902, 1904, 1906, 1908, 1910) are, e.g., implemented in accordance with device 300 of FIG. 3 and/or implemented to be able to implement a method in accordance with flowchart 200 of FIG. 2.

Consider that wireless communications device A 1902 and wireless communications device B 1904 are outside direct peer to peer communications range of one another. Further consider that wireless communications device C 1906 and wireless communications device D 1908 are outside direct peer to peer communications range of one another. The wireless communications devices (1902, 1904, 1906, 1908, 1910) have acquired peer discovery resources identifiers (1, 2, 3, 4, 5) respectively as indicated by boxes (1912, 1914, 1916, 1918, 1920), respectively. Specific peer discovery resources in the peer to peer frequency timing structure correspond to each of the peer discovery identifiers.

Wireless communications devices (device A 1902, device B 1904, device C 1906, device D 1908) includes peer discovery information (peer discovery (PD) A1 information 1922, peer discovery B1 information 1924, peer discovery C1 information 1926, peer discovery D1 information 1928) that it intends to transmit on its allocated resource in peer discovery resource block 1 1802. Wireless communications device A 1902 generates peer discovery signals $PD_{A1}$ 1930 including an own/combined (O/C) flag set to 0 1929 and PDA1 information 1922. Device A 1902 transmits, e.g., broadcasts, the generated signal 1930 using resource 1804. Wireless communications device C 1906 generates peer discovery signals $PD_{C1}$ 1932 including an own/combined (O/C) flag=0 1931 and PDC1 information 1926. Device C 1906 transmits, e.g., broadcasts, the generated signal 1932 using resource 1808. Transmitted signal $PD_{A1}$ 1930 is received by devices (device D 1908, device E 1910) which recover the communicated PDA1 information and store the received recovered information as indicated by blocks (1934, 1936), respectively. Transmitted signal $PD_{C1}$ 1932 is received by devices (device B 1904, device E 1910) which recover the communicated PDC1 information and store the received recovered information as indicated by blocks (1938, 1940), respectively.

Figure 20:
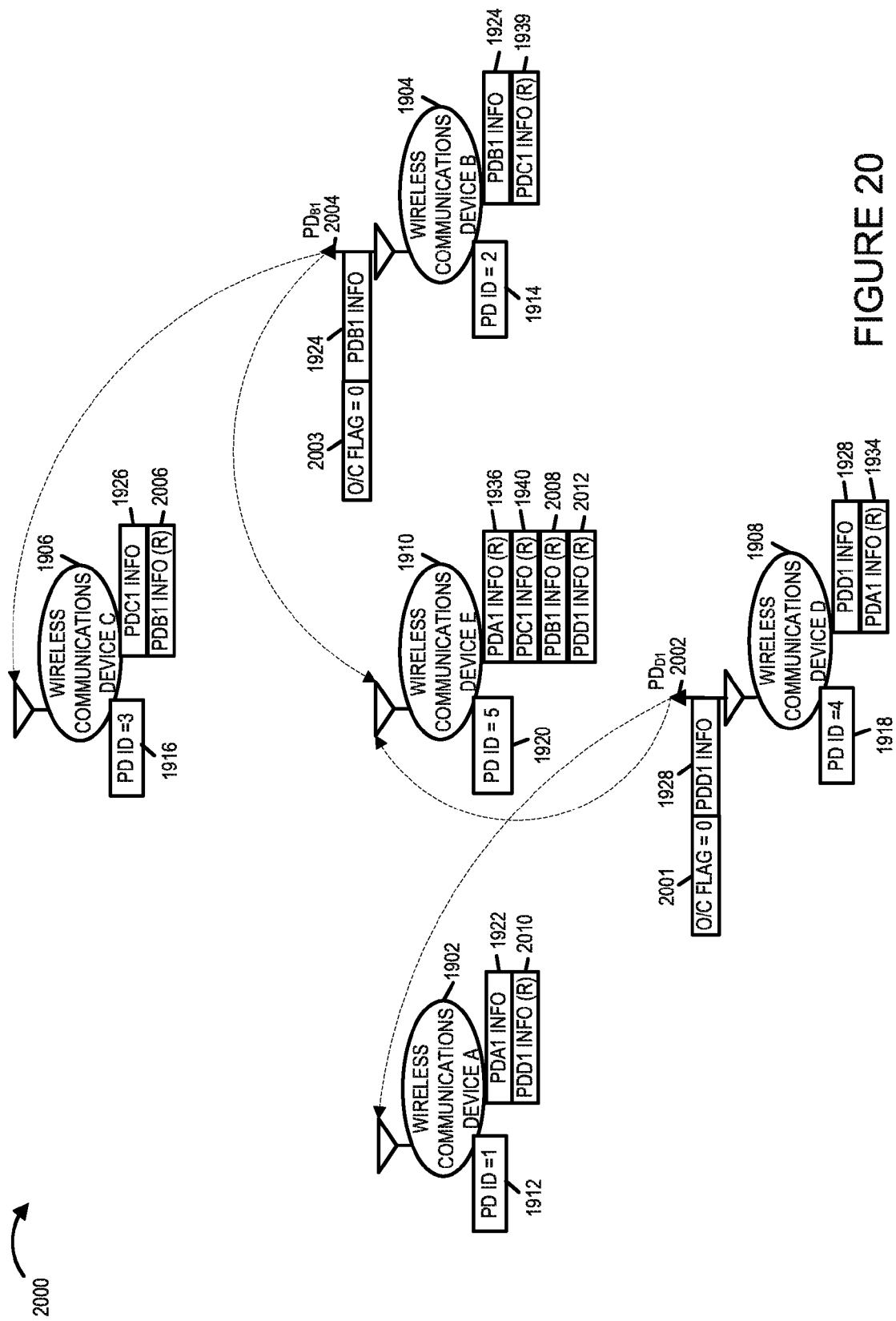
FIG. 20 is a second drawing in a second sequence of drawings used to illustrate the communication of peer discovery information including the communication of combined peer discovery information from multiple peers in accordance with an exemplary embodiment.

The example of FIG. 19 continues in drawing 2000 of FIG. 20. Wireless communications device D 1908 generates peer discovery signals $PD_{D1}$ 2002 including an own/combined (O/C) flag=0 2001 and PDD1 information 1928. Device D 1908 transmits, e.g., broadcasts, the generated signal 2002 using resource 1810. Wireless communications device B 1904 generates peer discovery signals $PD_{B1}$ 2004 including own/combined (O/C) flag=0 2003 and PDB1 information 1924. Device B 1904 transmits, e.g., broadcasts, the generated signal 2004 using resource 1806. Transmitted signal $PD_{D1}$ 2002 is received by devices (device A 1902, device E 1910) which recover the communicated PDD1 information and store the received recovered information as indicated by blocks (2010, 2012), respectively. Transmitted signal $PD_{B1}$ 2004 is received by devices (device C 1906, device E 1910) which recover the communicated PDB1 information and store the received recovered information as indicated by blocks (2006, 2008), respectively.

Figure 21:
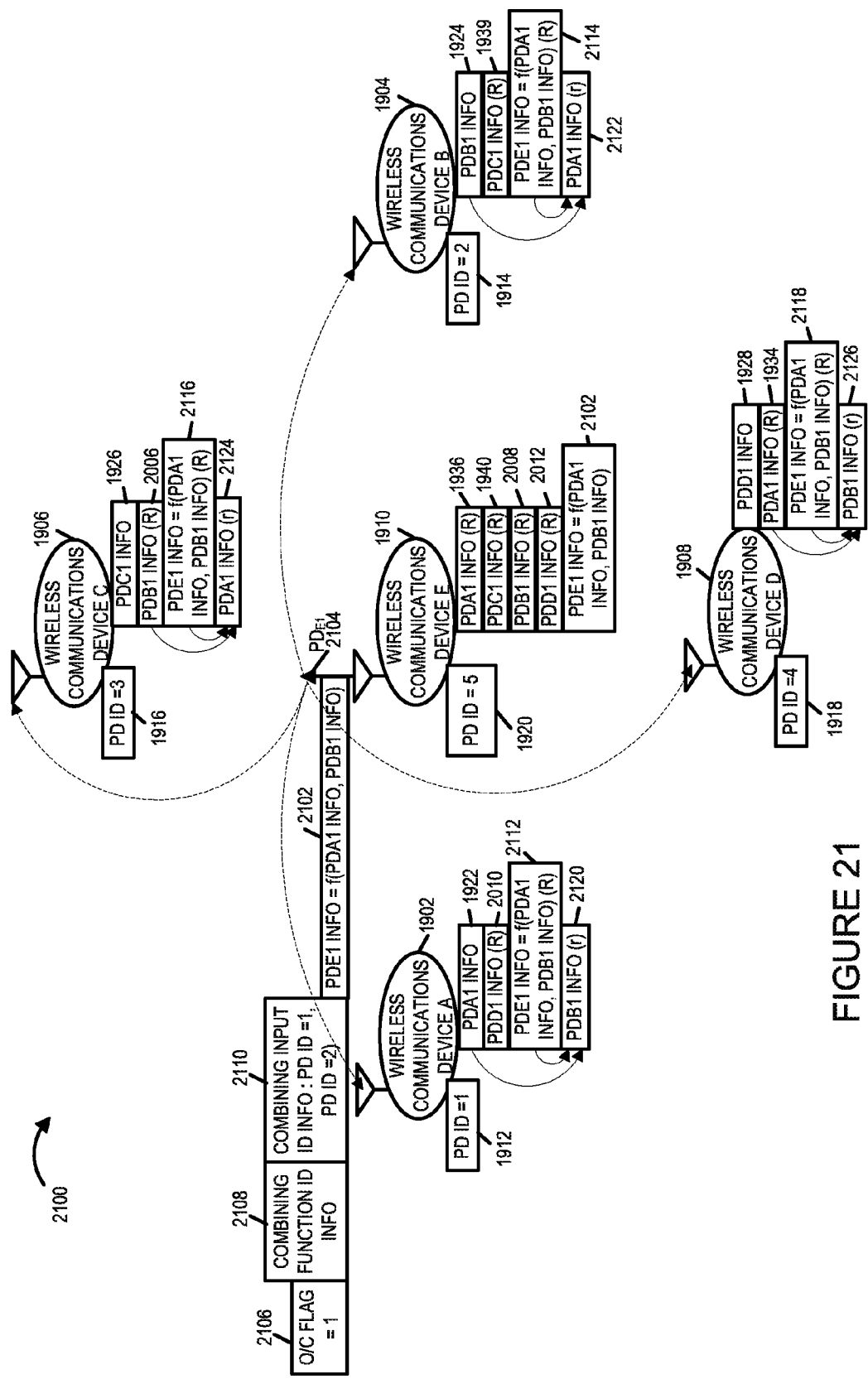
FIG. 21 is a third drawing in a second sequence of drawings used to illustrate the communication of peer discovery information including the communication of combined peer discovery information from multiple peers in accordance with an exemplary embodiment.

The example of FIG. 20 continues in drawing 2100 of FIG. 21. Wireless communications device E 1910 combines the received peer discovery information from device A 1902 and device B 1904 in accordance with a predetermined combining function to generate peer discovery information PDE1 2102, where PDE1 information=f(PDA1 info, PDB1 info). In various embodiments, the combining is performed in a predetermined manner. In some embodiments, device E 1910 performs a linear combination in a Galois field. Wireless communications device E 1910 generates signal $PD_{E1}$ 2104, which includes: an own/combined (O/C) flag=1 2106, combining function identification information 2108, combining input identification information indicating that the combined information corresponding the resources for peer discovery identifier=1 and peer discovery identifier=2 2110 and PDE1 information 2102. Device E 1910 transmits, e.g., broadcasts, the generated signal 2104. Transmitted signal $PD_{E1}$ 2104 is received by devices (device A 1902, device B 1904, device C 1906, device D 1908) which recover the communicated PDE1 information and store the received recovered information as indicated by blocks (2106, 2108, 2110, 2112), respectively.

Device A 1902 processes the received combined information PDE1 2112, using an inverse function to the function used to generate the combined information PDE1, to recover the peer discovery information from device B, the PDB1 information, as indicated by block 2120. Note that device A 1902 has a stored copy of PDA1 information 1922, which is utilized by the inverse function to perform the recovery.

Device B 1904 processes the received combined information PDE1 2114, using an inverse function to the function used to generate the combined information PDE1, to recover the peer discovery information from device A, the PDA1 information, as indicated by block 2122. Note that device B 1904 has a stored copy of PDB1 information 1924, which is utilized by the inverse function to perform the recovery.

Device C 1906 processes the received combined information PDE1 2116, using an inverse function to the function used to generate the combined information PDE1, to recover the peer discovery information from device A, the PDA1 information, as indicated by block 2124. Note that device C 1906 has a stored copy of PDB1 information 2006, which is utilized by the inverse function to perform the recovery.

Device D 1908 processes the received combined information PDE1 2118, using an inverse function to the function used to generate the combined information PDE1, to recover the peer discovery information from device B, the PDB1 information, as indicated by block 2126. Note that device D 1908 has a stored copy of PDA1 information 1934, which is utilized by the inverse function to perform the recovery.

Figure 22:
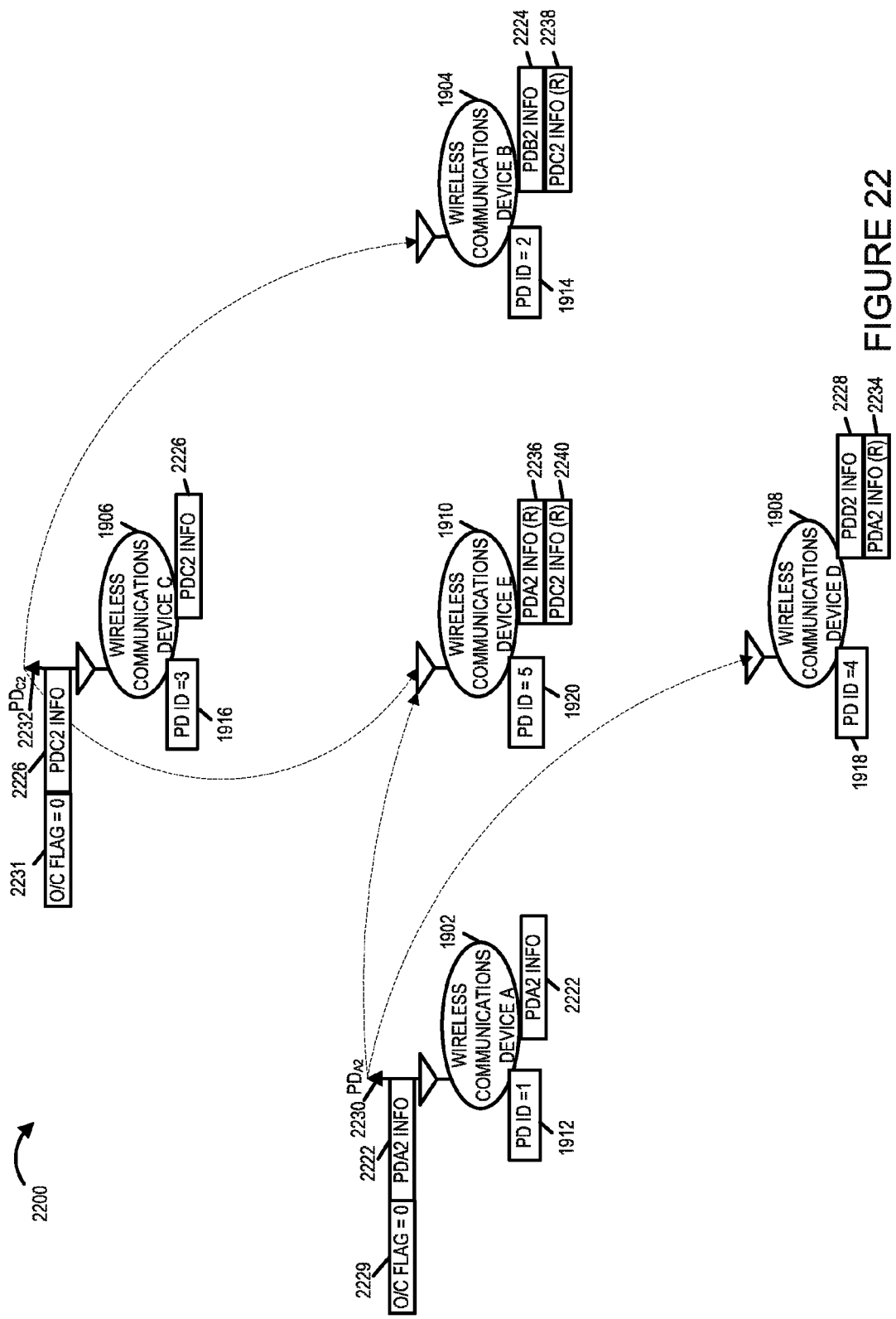
FIG. 22 is a fourth drawing in a second sequence of drawings used to illustrate the communication of peer discovery information including the communication of combined peer discovery information from multiple peers in accordance with an exemplary embodiment.

The example, of FIG. 21 continues with drawing 2200 of FIG. 22. Wireless communications devices (device A 1902, device B 1904, device C 1906, device D 1908) includes peer discovery information (peer discovery (PD) A2 information 2222, peer discovery B2 information 2224, peer discovery C2 information 2226, peer discovery D2 information 2228) that it intends to transmit on its allocated resource in peer discovery resource block 2 1822. Wireless communications device A 1902 generates peer discovery signals $PD_{A2}$ 2230 including an own/combined (O/C) flag=0 2229 and PDA2 information 2222. Device A 1902 transmits, e.g., broadcasts, the generated signal 2230 using resource 1824. Wireless communications device C 1906 generates peer discovery signals $PD_{C2}$ 2232 including an own/combined (O/C) flag=0 2231 and PDC2 information 2226. Device C 1906 transmits, e.g., broadcasts, the generated signal 2232 using resource 1828. Transmitted signal $PD_{A2}$ 2230 is received by devices (device D 1908, device E 1910) which recover the communicated PDA2 information and store the received recovered information as indicated by blocks (2234, 2236), respectively. Transmitted signal $PD_{C2}$ 2232 is received by devices (device B 1904, device E 1910) which recover the communicated PDC2 information and store the received recovered information as indicated by blocks (2238, 2240), respectively.

Figure 23:
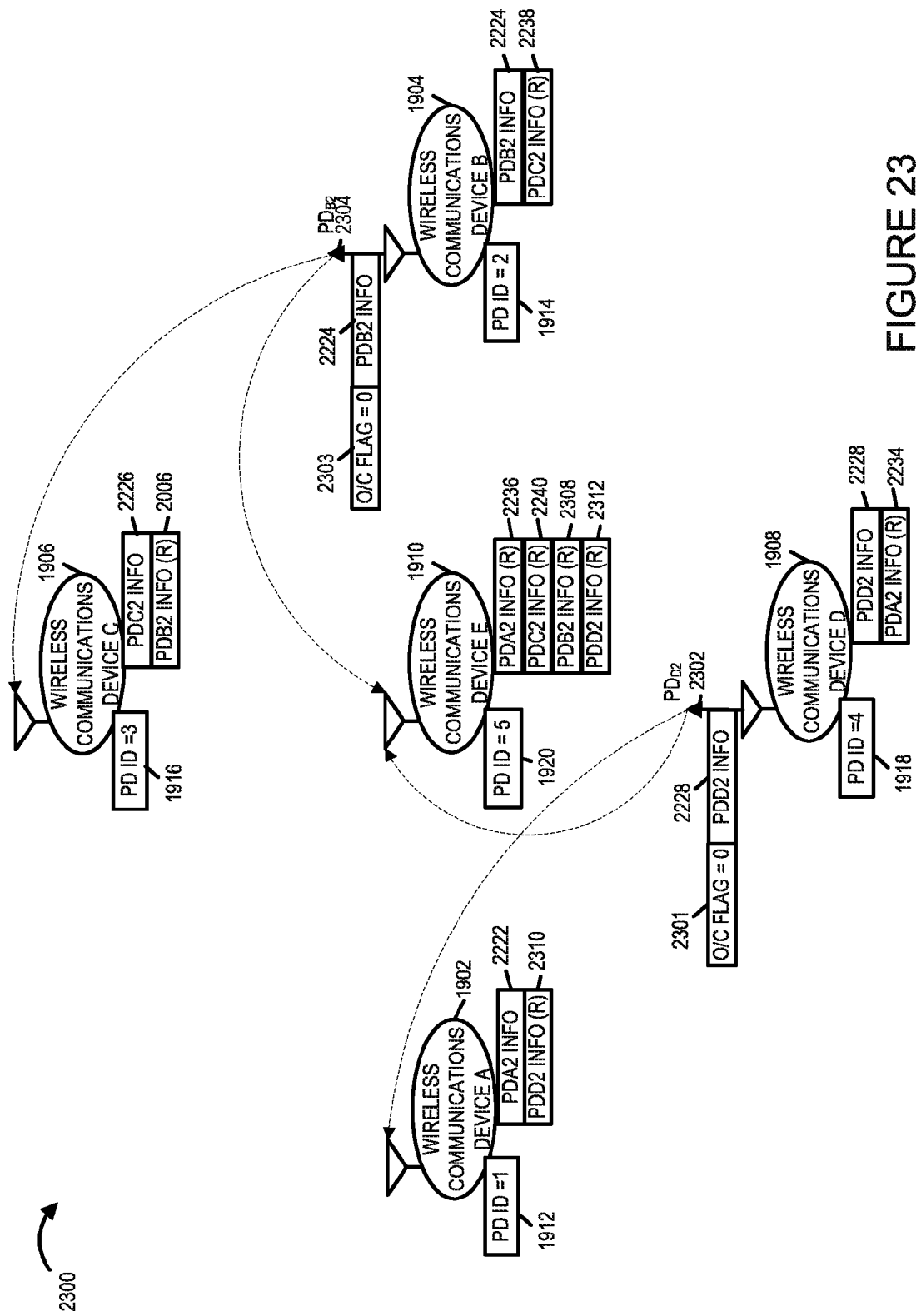
FIG. 23 is a fifth drawing in a second sequence of drawings used to illustrate the communication of peer discovery information including the communication of combined peer discovery information from multiple peers in accordance with an exemplary embodiment.

The example of FIG. 22 continues in drawing 2300 of FIG. 23. Wireless communications device D 1908 generates peer discovery signals $PD_{D2}$ 2302 including and own/combined (O/C) flag=0 2301 and PDD2 information 2228. Device D 1908 transmits, e.g., broadcasts, the generated signal 2302 using resource 1830. Wireless communications device B 1904 generates peer discovery signals $PD_{B2}$ 2304 including an own/combined flag=0 2303 and PDB2 information 2224. Device B 1904 transmits, e.g., broadcasts, the generated signal 2304 using resource 1826. Transmitted signal $PD_{D2}$ 2302 is received by devices (device A 1902, device E 1910) which recover the communicated PDD2 information and store the received recovered information as indicated by blocks (2310, 2312), respectively. Transmitted signal $PD_{B2}$ 2304 is received by devices (device C 1906, device E 1910) which recover the communicated PDB2 information and store the received recovered information as indicated by blocks (2306, 2308), respectively.

Figure 24:
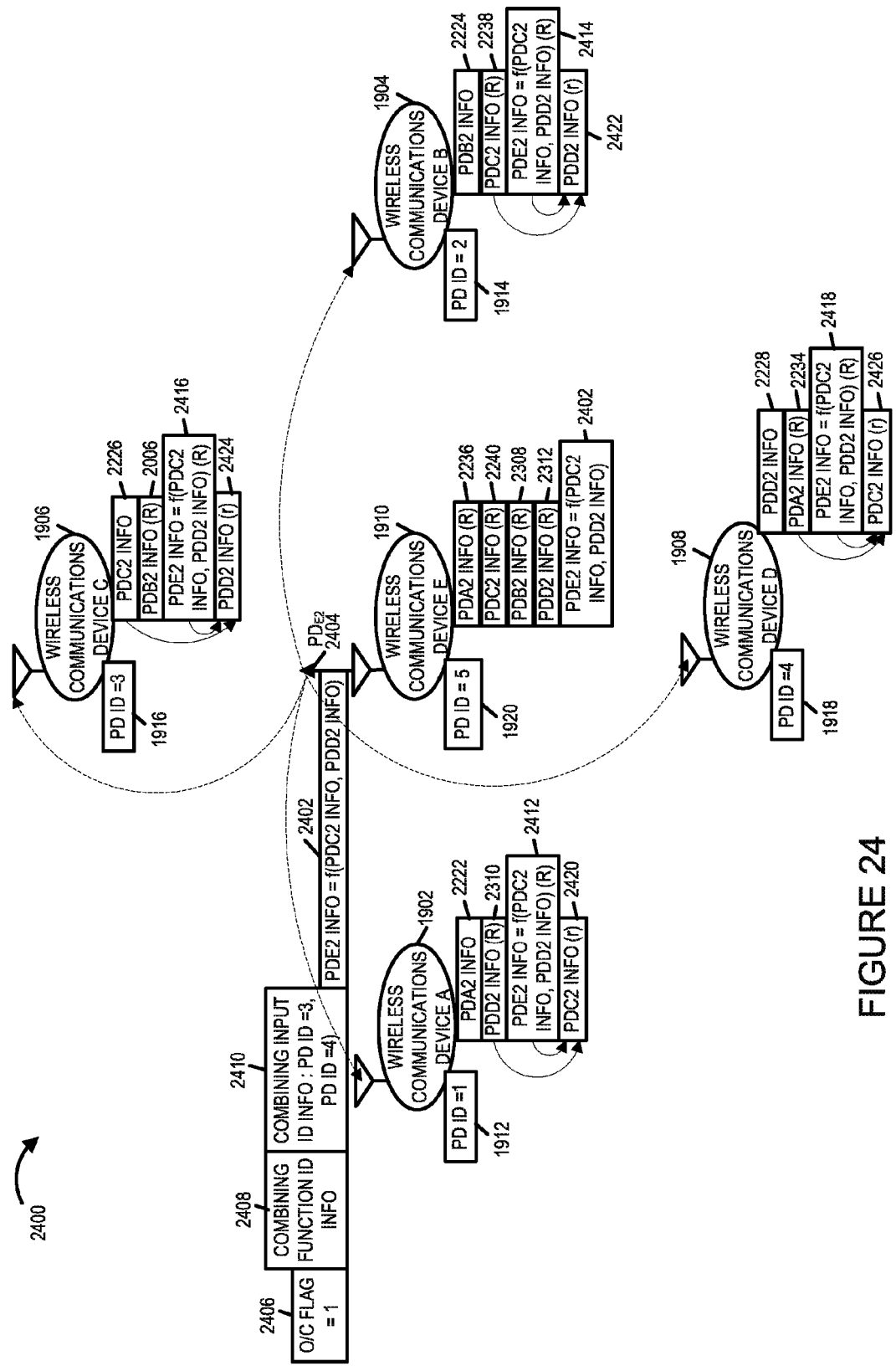
FIG. 24 is a sixth drawing in a second sequence of drawings used to illustrate the communication of peer discovery information including the communication of combined peer discovery information from multiple peers in accordance with an exemplary embodiment.

The example of FIG. 23 continues in drawing 2400 of FIG. 24. Wireless communications device E 1910 combines the received peer discovery information from device C 1906 and device D 1908 in accordance with a predetermined combining function to generate peer discovery information PDE2 2402, where PDE2 information=f(PDC2 info, PDD2 info). In various embodiments, the combining is performed in accordance with one of a plurality of predetermined alternatives. In some embodiments, device E 1910 performs a linear combination in a Galois field. Wireless communications device E 1910 generates signal $PD_{E2}$ 2404, which includes: an own/combined (O/C) flag=1 2406, combining function identification information 2408, combining input identification information indicating that information corresponding to peer identifier=3 and peer identifier=4 are being combined 2410 and PDE2 information 2402. Device E 1910 transmits, e.g., broadcasts, the generated signal 2404. Transmitted signal $PD_{E2}$ 2404 is received by devices (device A 1902, device B 1904, device C 1906, device D 1908) which recover the communicated PDE2 information and store the received recovered information as indicated by blocks (2412, 2414, 2416, 2418), respectively.

Device A 1902 processes the received combined information PDE2 2412, using an inverse function to the function used to generate the combined information PDE2, to recover the peer discovery information from device C, the PDC2 information, as indicated by block 2420. Note that device A 1902 has a stored copy of PDD2 information, info 2310, which is utilized by the inverse function to perform the recovery.

Device B 1904 processes the received combined information PDE2 2414, using an inverse function to the function used to generate the combined information PDE2, to recover the peer discovery information from device D, the PDD2 information, as indicated by block 2422. Note that device B 1904 has a stored copy of PDC2 information 2238, which is utilized by the inverse function to perform the recovery.

Device C 1906 processes the received combined information PDE2 2416, using an inverse function to the function used to generate the combined information PDE2, to recover the peer discovery information from device D, the PDD2 information, as indicated by block 2424. Note that device C 1906 has a stored copy of PDC2 information 2226, which is utilized by the inverse function to perform the recovery.

Device D 1908 processes the received combined information PDE2 2418, using an inverse function to the function used to generate the combined information PDE2, to recover the peer discovery information from device C, the PDC2 information, as indicated by block 2426. Note that device D 1908 has a stored copy of PDD2 information 2228, which is utilized by the inverse function to perform the recovery.

Figure 25:
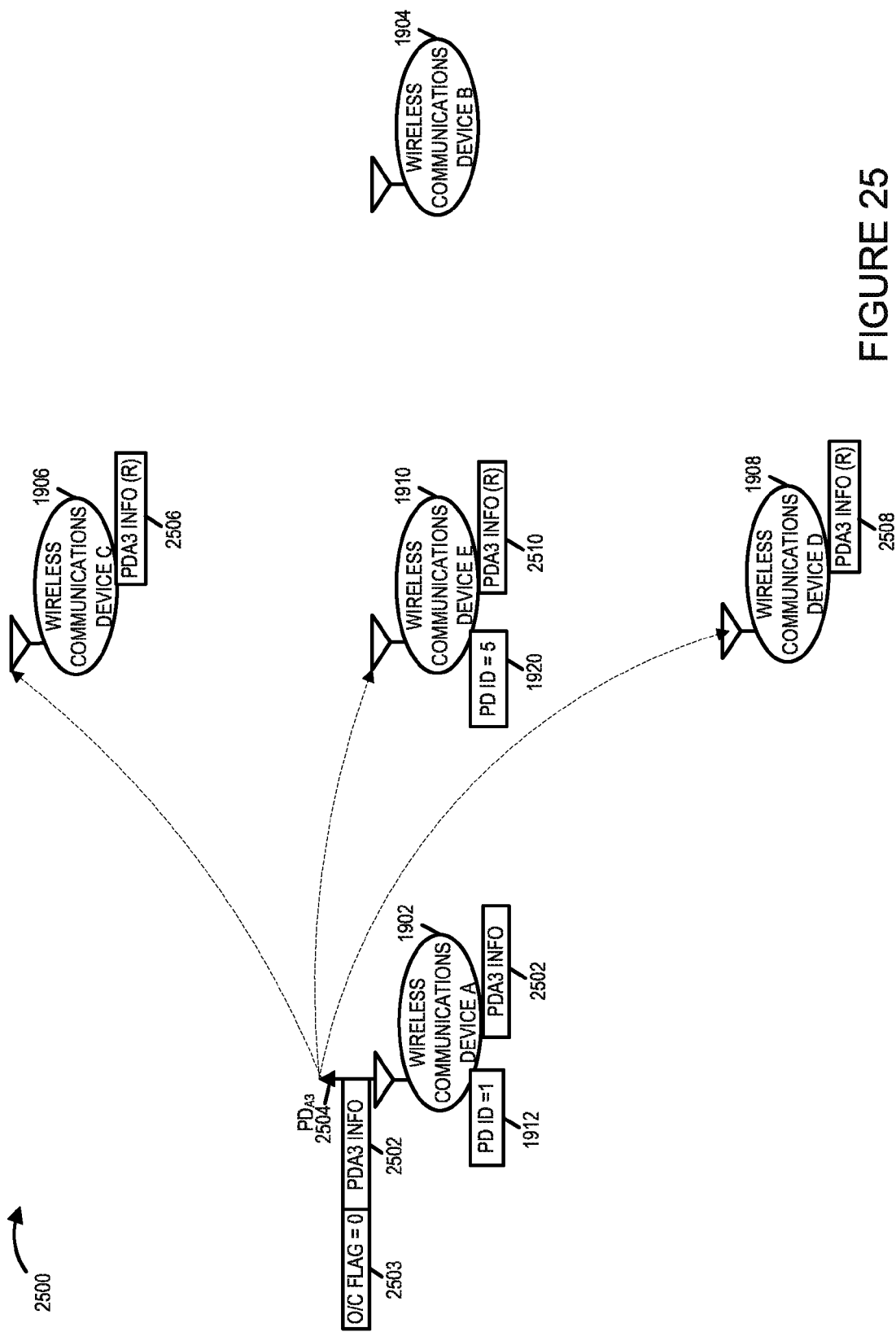

The example of FIG. 24 continues in drawing 2500 of FIG. 25. Wireless communications device A 1902 has peer discovery information PDA3 info 2502 that it intends to transmit.

Device A 1902 generates peer discovery signal $PD_{A3}$ 2504 which includes an own/combined (O/C) flag=0 2503 and PDA3 information 2502. Device A 1902 transmits signal $PD_{A3}$ 2504 using peer discovery resource 1844 of peer discovery resource block 3 1842. Signal $PD_{A3}$ 2504 is received by devices (device C 1906, device D 1908, device E 1910), respectively, and the PDA3 information is recovered and stored as indicated by boxes (2506, 2508, 2510), respectively.

Figure 26:
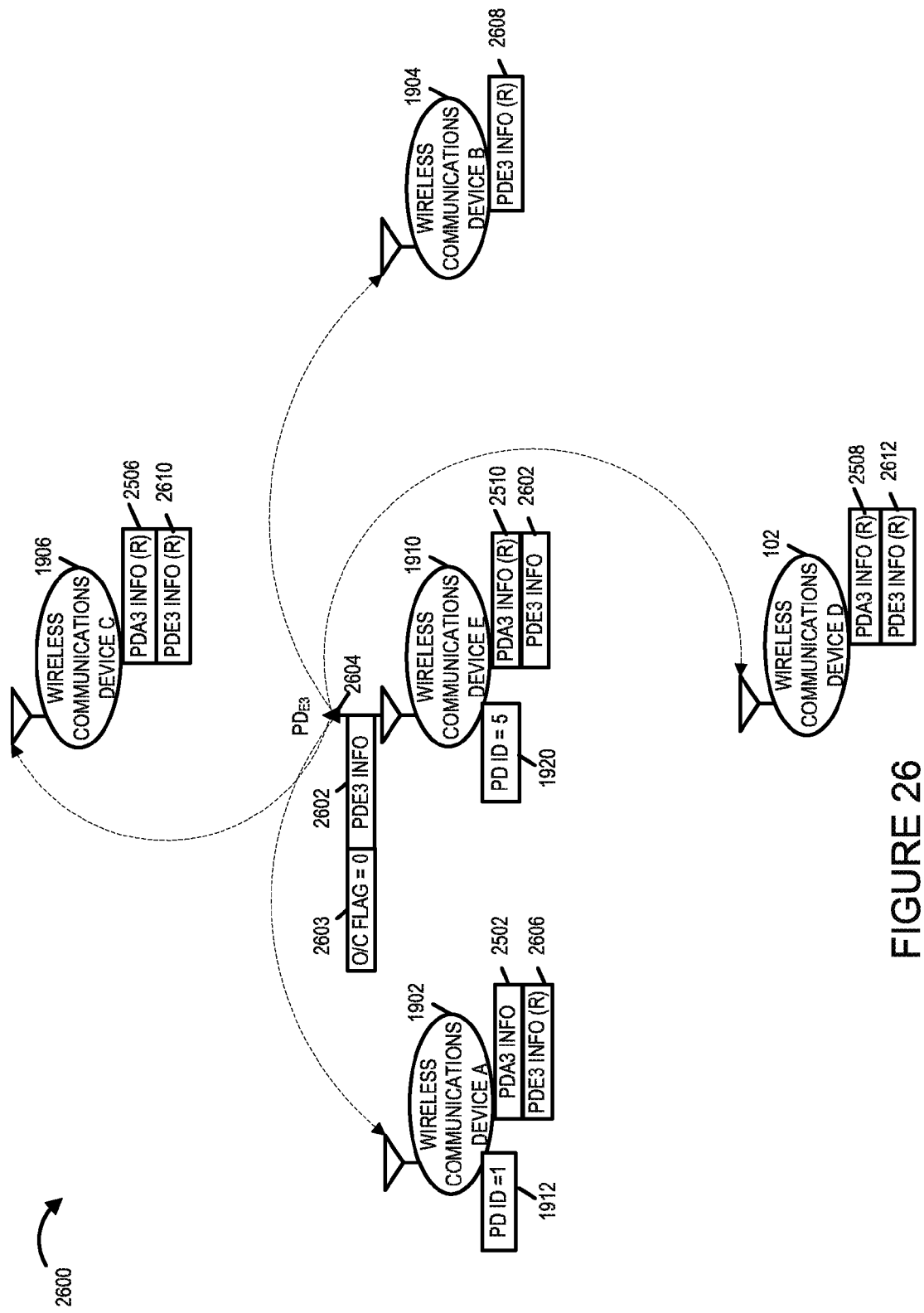
FIG. 26 is a seventh drawing in a second sequence of drawings used to illustrate the communication of peer discovery information including the communication of combined peer discovery information from multiple peers in accordance with an exemplary embodiment.

The example of FIG. 25 continues in drawing 2600 of FIG. 26. Wireless communications device E 1910 has peer discovery information PDE3 info 2602 that it intends to transmit. PDE3 information 2602 is peer discovery information pertaining to device E 1910, e.g., a device identifier for device E, a user identifier for a user of device E, a group identifier of which device E or its user belongs, information that device E wants to advertise, a request for information by device E, etc. Thus at this time device E intends to transmit its own peer discovery information rather than transmitting combined peer discovery information corresponding to other peer devices. Device E 1910 generates peer discovery signal $PD_{E3}$ 2604 which includes an own/combined (O/C) flag=0 2603 and PDE3 information 2602. Device E 1910 transmits signal $PD_{E3}$ 2604 using peer discovery resource 1852 of peer discovery resource block 3 1842. Signal $PD_{E3}$ 2604 is received by devices (device A 1902, device B 1904, device C 1906, device D 1908), respectively, and the PDE3 information is recovered and stored as indicated by boxes (2606, 2608, 2610), respectively.

Figure 27:
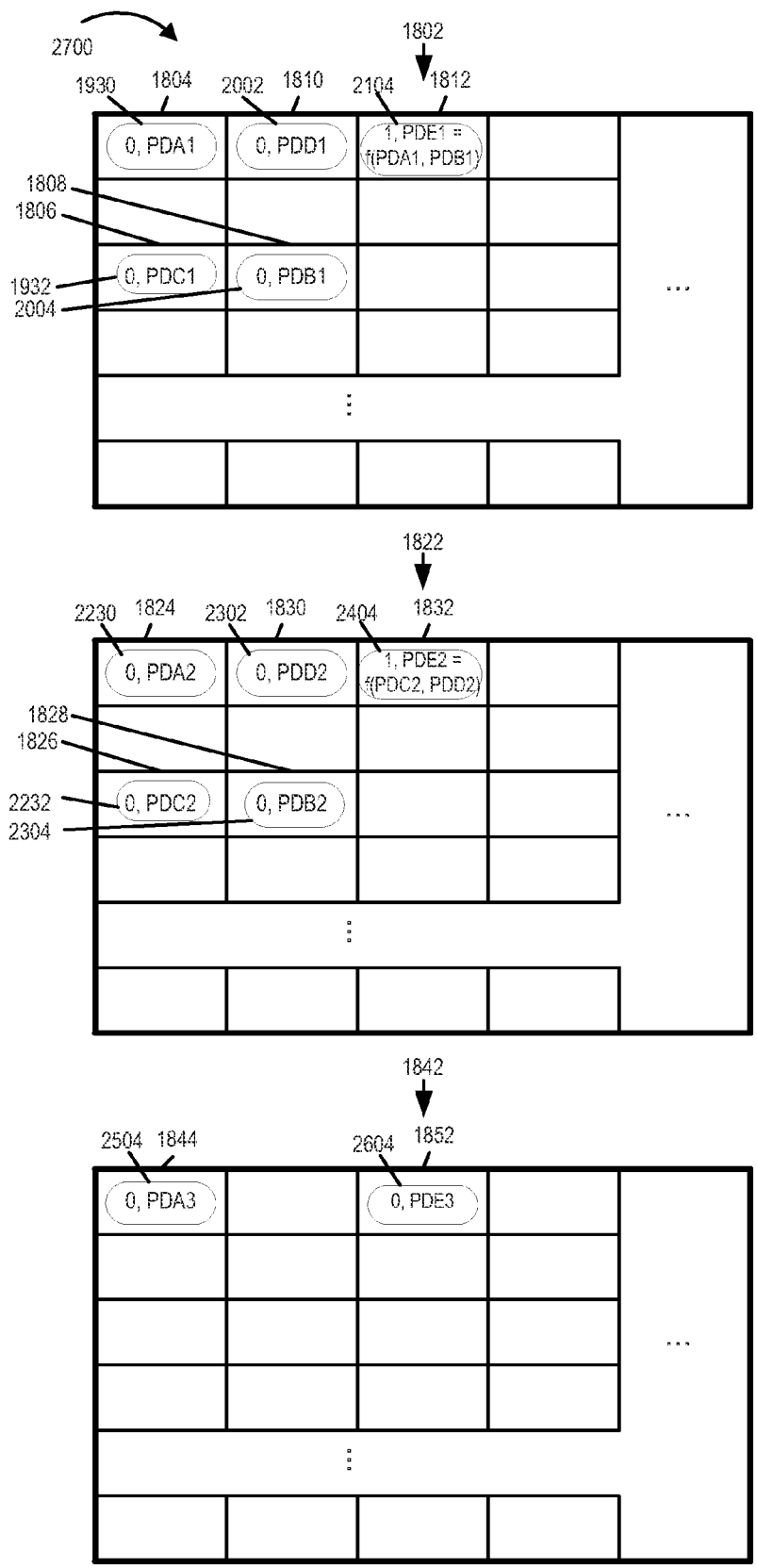
FIG. 27 is a drawing illustrating a mapping of signals generated and transmitted in the example of FIGS. 19-26 to the peer discovery air link resources of FIG. 18.

FIG. 27 is a drawing 2700 illustrating exemplary peer discovery link resources, exemplary signals and exemplary information conveyed by the exemplary peer link resources for the example of FIG. 19-26. In peer discovery resource block 1 1802, peer discovery resource 1804 corresponding to peer discovery identifier=1 conveys peer discovery signal $PD_{A1}$ 1930 which includes peer discovery information an O/C flag=0 and PDA1 information. In peer discovery resource block 1 1802, peer discovery resource 1808 corresponding to peer discovery identifier=3 conveys peer discovery signal $PD_{C1}$ 1932 which includes an O/C flag=0 and peer discovery information PDC1. In peer discovery resource block 1 1802, peer discovery resource 1810 corresponding to peer discovery identifier=4 conveys peer discovery signal $PD_{D1}$ 2002 which includes an O/C flag=0 and peer discovery information PDD1. In peer discovery resource block 1 1802, peer discovery resource 1806 corresponding to peer discovery identifier=2 conveys peer discovery signal $PD_{B1}$ 2004 which includes an O/C flag=0 and peer discovery information PDB1. In peer discovery resource block 1 1802, peer discovery resource 1812, which corresponds to peer discovery identifier=5, is used to convey peer discovery signal $PD_{E1}$ 2104 which includes and O/C flag=1 and peer discovery information PDE1, where PDE1=f(PDA1, PDB1). Thus information communicated in resource 1802 is a function of information communicated in resources 1804 and 1806.

In peer discovery resource block 2 1822, peer discovery resource 1824 corresponding to peer discovery identifier=1 conveys peer discovery signal $PD_{A2}$ 2230 which includes peer discovery information an O/C flag=0 and PDA2 information. In peer discovery resource block 2 1822, peer discovery resource 1828 corresponding to peer discovery identifier=3 conveys peer discovery signal $PD_{C2}$ 2232 which includes an O/C flag=0 and peer discovery information PDC2. In peer discovery resource block 2 1822, peer discovery resource 1830 corresponding to peer discovery identifier=4 conveys peer discovery signal $PD_{D2}$ 2302 which includes an O/C flag=0 and peer discovery information PDD2. In peer discovery resource block 2 1822, peer discovery resource 1826 corresponding to peer discovery identifier=2 conveys peer discovery signal $PD_{B2}$ 2304 which includes an O/C flag=0 and peer discovery information PDB2. In peer discovery resource block 2 1822, peer discovery resource 1832, which corresponds to peer discovery identifier=5, is used to convey peer discovery signal $PD_{E2}$ 2404 which includes and O/C flag=1 and peer discovery information PDE2, where PDE2=f(PDC2, PDD2). Thus information communicated in resource 1832 is a function of information communicated in resources 1848 and 1830.

In peer discovery resource block 3 1842, peer discovery resource 1844 corresponding to peer discovery identifier=1 conveys peer discovery signal $PD_{A3}$ 2504 which includes peer discovery information an O/C flag=0 and PDA3 information. In peer discovery resource block 3 1842, peer discovery resource 1852 corresponding to peer discovery identifier=5 conveys peer discovery signal $PD_{E2}$ 2604 which includes an O/C flag=0 and peer discovery information PDE3.

In the example of FIGS. 19-26, the approach used allows for more flexibility than the approach of FIG. 10-15; however, more signaling overhead is used, e.g., the inclusion of the O/C flag field, the combining function ID information field, and the combining input information field.

In the example, of FIG. 19-26 some of the device (device A 1902, device B 1904, device C 1906, and device D 1908) are observed to transmit their own peer discovery information and receive and process combined peer discovery information from device E 1910. Device E 1910 may also receive and process combined peer discovery information from other peer devices in the system. Thus device E 1910 may transmit a generated peer discovery signal which is a combination of peer discovery information received from other peer devices and then at a later time process a received peer discovery signal from another peer discovery resource unit with an inverse function to obtain a peer discovery message including information corresponding to a plurality of peer devices, said inverse function being an inverse to a combining function used to the generate the received peer discovery signals. Any of the devices (device A 1902, device B 1904, device C 1906, and device D 1908) may also relay combined peer discovery information and serve in a similar capability as device E 1910.

Various methods and apparatus described in this application are well suited for use in wireless communications devices and networks supporting peer to peer signaling. In various embodiments a device of any of one or more of FIGS. 1-27 includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the wireless communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile wireless communications devices, e.g., mobile nodes such as mobile terminals, stationary wireless communications devices such as access points such as base stations, network nodes and/or communications systems. Various embodiments are also directed to methods, e.g., method of controlling and/or operating wireless communications devices such as mobile nodes and/or stationary nodes, access points such as base stations network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal reception, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device supporting peer to peer signaling, including a processor configured to implement one, multiple or all of the steps of one or more methods of the invention.

In some embodiments, the processor or processors, e.g., CPUs, of one or more devices, e.g., communications nodes such as wireless terminals, access nodes, and/or network nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless device, the method comprising:
   receiving peer discovery signals from other peer devices;
   transmitting a generated peer discovery signal which is a combination of peer discovery information received from other peer devices; and
   processing a received peer discovery signal from another peer discovery resource unit with an inverse function to obtain a peer discovery message including information corresponding to a plurality of peer devices, said inverse function being an inverse to a combining function used to generate the received peer discovery signal.

2. The method of claim 1, further comprising:
   producing said generated peer discovery signal by combining information obtained by decoding peer discovery signals received from at least two other peer devices.

3. A method of operating a wireless device, the method comprising:
   receiving peer discovery signals from other peer devices;

transmitting a generated peer discovery signal which is a combination of peer discovery information received from other peer devices; and producing said generated peer discovery signal by combining information obtained by decoding peer discovery signals received from at least two other peer devices, wherein said transmitting a generated peer discovery signal includes transmitting said generated peer discovery signal using a transmission resource which can be used to transmit a peer discovery signal corresponding to said wireless device or a peer discovery signal generated from signals received from a predetermined set of peer devices.

4. The method of claim 3, wherein said transmitted generated peer discovery signal includes information indicating that the transmitted generated peer discovery signal is a peer discovery signal which is a combination of peer discovery information received from other peer devices.

5. A wireless device comprising:
means for receiving peer discovery signals from other peer devices;
means for transmitting a generated peer discovery signal which is a combination of peer discovery information received from other peer devices; and
means for processing a received peer discovery signal from another peer discovery resource unit with an inverse function to obtain a peer discovery message including information corresponding to a plurality of peer devices, said inverse function being an inverse to a combining function used to generate the received peer discovery signal.

6. The wireless device of claim 5, further comprising:
means for producing said generated peer discovery signal by combining information obtained by decoding peer discovery signals received from at least two other peer devices.

7. A wireless device comprising:
means for receiving peer discovery signals from other peer devices;
means for transmitting a generated peer discovery signal which is a combination of peer discovery information received from other peer devices; and
means for producing said generated peer discovery signal by combining information obtained by decoding peer discovery signals received from at least two other peer devices,
wherein said means for transmitting a generated peer discovery signal includes means for transmitting said generated peer discovery signal using a transmission resource which can be used to transmit a peer discovery signal corresponding to said wireless device or a peer discovery signal generated from signals received from a predetermined set of peer devices.

8. The wireless device of claim 7, wherein said transmitted generated peer discovery signal includes information indicating that the transmitted generated peer discovery signal is a peer discovery signal which is a combination of peer discovery information received from other peer devices.

9. A computer program product for use in a wireless device, the computer program product comprising:
a non-transitory computer readable medium comprising:
code for causing at least one computer to receive peer discovery signals from other peer devices;
code for causing said at least one processor to transmit a generated peer discovery signal which is a combination of peer discovery information received from other peer devices; and
code for causing said at least one processor to process a received peer discovery signal from another peer discovery resource unit with an inverse function to obtain a peer discovery message including information corresponding to a plurality of peer devices, said inverse function being an inverse to a combining function used to generate the received peer discovery signal.

10. The computer program product of claim 9, wherein said non-transitory computer readable medium comprises:
code for causing said at least one processor to produce said generated peer discovery signal by combining information obtained by decoding peer discovery signals received from at least two other peer devices.

11. A computer program product for use in a wireless device, the computer program product comprising:
a non-transitory computer readable medium comprising:
code for causing at least one computer to receive peer discovery signals from other peer devices;
code for causing said at least one processor to transmit a generated peer discovery signal which is a combination of peer discovery information received from other peer devices; and
code for causing said at least one processor to produce said generated peer discovery signal by combining information obtained by decoding peer discovery signals received from at least two other peer devices,
wherein said code for causing said at least one processor to transmit a generated peer discovery signal includes code for causing said at least one processor to transmit said generated peer discovery signal using a transmission resource which can be used to transmit a peer discovery signal corresponding to said wireless device or a peer discovery signal generated from signals received from a predetermined set of peer devices.

12. The computer program product of claim 11, wherein said transmitted generated peer discovery signal includes information indicating that the transmitted generated peer discovery signal is a peer discovery signal which is a combination of peer discovery information received from other peer devices.

13. A wireless device comprising:
at least one processor configured to:
receive peer discovery signals from other peer devices;
transmit a generated peer discovery signal which is a combination of peer discovery information received from other peer devices; and
process a received peer discovery signal from another peer discovery resource unit with an inverse function to obtain a peer discovery message including information corresponding to a plurality of peer devices, said inverse function being an inverse to a combining function used to generate the received peer discovery signal; and
memory coupled to said at least one processor.

14. The wireless device of claim 13, wherein said at least one processor is further configured to:
produce said generated peer discovery signal by combining information obtained by decoding peer discovery signals received from at least two other peer devices.

15. A wireless device comprising:
at least one processor configured to:
receive peer discovery signals from other peer devices;
transmit a generated peer discovery signal which is a combination of peer discovery information received from other peer devices; and produce said generated peer discovery signal by combining information obtained by decoding peer discovery signals received from at least two other peer devices; and memory coupled to said at least one processor, wherein said at least one processor is configured to transmit said generated peer discovery signal using a transmission resource which can be used to transmit a peer discovery signal corresponding to said wireless device or a peer discovery signal generated from signals received from a predetermined set of peer devices, as part of being configured to said transmitting a generated peer discovery signal.

16. The wireless device of claim 15, wherein said transmitted generated peer discovery signal includes information indicating that the transmitted generated peer discovery signal is a peer discovery signal which is a combination of peer discovery information received from other peer devices.

* * * * *